United States Patent
Takahashi

(10) Patent No.: US 12,200,593 B2
(45) Date of Patent: Jan. 14, 2025

(54) MANAGEMENT APPARATUS, COMMUNICATION SYSTEM, MANAGEMENT METHOD, AND PROGRAM

(71) Applicants: NEC Corporation, Tokyo (JP); NEC Platforms, Ltd., Kawasaki (JP)

(72) Inventor: Shunsuke Takahashi, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 336 days.

(21) Appl. No.: 17/704,278

(22) Filed: Mar. 25, 2022

(65) Prior Publication Data

US 2022/0312174 A1    Sep. 29, 2022

(30) Foreign Application Priority Data

Mar. 29, 2021 (JP) ................................. 2021-054597

(51) Int. Cl.
*H04W 4/90* (2018.01)
*H04W 72/0453* (2023.01)

(52) U.S. Cl.
CPC ......... *H04W 4/90* (2018.02); *H04W 72/0453* (2013.01)

(58) Field of Classification Search
CPC ............... H04W 4/90; H04W 72/0453; H04W 28/0252; H04W 76/10
USPC ..................................................... 455/404.1
See application file for complete search history.

(56) References Cited

U.S. PATENT DOCUMENTS

| | | | | |
|---|---|---|---|---|
| 2009/0280849 A1* | 11/2009 | Rosen | ............... | H04L 47/824 |
| | | | | 455/518 |
| 2014/0011471 A1* | 1/2014 | Khosla | ............... | H04W 4/90 |
| | | | | 455/456.1 |
| 2022/0182872 A1* | 6/2022 | John | ............... | H04W 28/0284 |

FOREIGN PATENT DOCUMENTS

| | | | | |
|---|---|---|---|---|
| JP | 2010157881 | * 12/2008 | ............ | H04W 24/08 |
| JP | 2010-157881 A | 7/2010 | | |
| JP | 2019525506 | * 9/2019 | ............ | H04W 76/10 |

* cited by examiner

*Primary Examiner* — Maria El-Zoobi

(57) ABSTRACT

A management apparatus is configured to determine whether or not distribution of status information representing a wireless communication status in a public wireless system including at least one wireless station that executes wireless communication with a wireless terminal is necessary. The distribution is a distribution to a mobile communication terminal via a mobile communication system that provides a mobile communication service to the mobile communication terminal. The management apparatus is configured to transmit, when it is determined that the distribution is necessary, a request to the mobile communication system to set a dedicated fixed channel in a public communication network used in the mobile communication system. The dedicated fixed channel is fixed exclusively for the public wireless system. The management apparatus is configured to transmit the status information to the mobile communication system to distribute the status information to the mobile communication terminal via the dedicated fixed channel.

20 Claims, 15 Drawing Sheets

MANAGEMENT APPARATUS, COMMUNICATION SYSTEM, MANAGEMENT METHOD, AND PROGRAM

INCORPORATION BY REFERENCE

This application is based upon and claims the benefit of priority from Japanese patent application No. 2021-054597, filed on Mar. 29, 2021, the disclosure of which is incorporated herein in its entire by reference.

TECHNICAL FIELD

The present disclosure relates to a management apparatus, a communication system, a management method, and a program.

BACKGROUND ART

In the field of public safety such as fire prevention, disaster prevention, and transportation, a public organization uniquely operates an independent communication infrastructure (public wireless system) including wireless facilities. By constructing such a public wireless system, an emergency call can be made without being affected by a line condition (for example, congestion) of the public communication network in case of emergency.

Japanese Unexamined Patent Application Publication No. 2010-157881 describes a disaster prevention communication system for rapidly understanding a damage situation during a disaster, the system including a mobile operator network and a fire and disaster prevention wireless network. The mobile operator network includes a communication infrastructure monitoring server that configures a mobile communication network and monitors the communication network. The fire and disaster prevention wireless network includes a victim movement monitoring server and a rescue movement monitoring server that configure a business wireless communication network and monitor the communication network.

The communication infrastructure monitoring server specifies a service area where failure occurs during a disaster and notifies this service area to the fire and disaster prevention wireless network. The victim movement monitoring server and the rescue movement monitoring server notify the specified service area where failure occurs to a wireless device that is under control, and execute the following acquisition process. That is, in the acquisition process, information regarding a mobile phone that configures a sensor network is acquired via the sensor network from the wireless device positioned in the service area. The information regarding the mobile phone acquired from the wireless device indicates position information acquired by the mobile phone based on a GPS (Global Positioning System) function and an identification number of the mobile phone.

Incidentally, in the public wireless system, due to locations, costs, and the like, there is a limit to the number of wireless stations (wireless facilities that can be broadly classified into base stations or relay stations) that can be provided, and areas where communication is available or the number of lines is limited.

Therefore, when device failure occurs in the wireless station of the public wireless system in case of emergency, communication with mobile wireless devices under the control of the wireless station cannot be executed. Therefore, information regarding a communication availability status (for example, a communication available area, a communication unavailable area, or the number of available communication lines) of the public wireless system cannot be obtained. The disaster prevention communication system described in Japanese Unexamined Patent Application Publication No. 2010-157881 cannot solve this problem.

SUMMARY

An object of the present disclosure is to solve the above-described problem and to provide a management apparatus, a communication system, a management method, and a program where, even when a wireless terminal cannot communicate with a wireless station in a public wireless system, a user of the wireless terminal can obtain a communication availability status of the public wireless system.

A management apparatus according to a first aspect of the present disclosure includes a determination unit, a request transmission unit, and an information transmission unit. The determination unit is configured to determine whether or not distribution of status information to a mobile communication terminal via a mobile communication system that provides a mobile communication service to the mobile communication terminal is necessary, the status information representing a wireless communication status in a public wireless system including at least one wireless station that executes wireless communication with a wireless terminal. The request transmission unit is configured to transmit, when the determination unit determines that the distribution is necessary, a request to the mobile communication system to set a dedicated fixed channel in a public communication network used in the mobile communication system, the dedicated fixed channel being fixed exclusively for the public wireless system. The information transmission unit is configured to transmit the status information to the mobile communication system to distribute the status information to the mobile communication terminal via the dedicated fixed channel.

A communication system according to a second aspect of the present disclosure includes a wireless terminal, a management apparatus configured to manage communication in a public wireless system including at least one wireless station that executes wireless communication with the wireless terminal, a mobile communication terminal, and a communication management apparatus. The communication management apparatus is configured to manage communication in a mobile communication system that provides a mobile communication service to the mobile communication terminal. The management apparatus includes a determination unit configured to determine whether or not distribution of status information to a mobile communication terminal via the mobile communication system is necessary, the status information representing a wireless communication status in the public wireless system. The management apparatus includes a request transmission unit configured to transmit, when the determination unit determines that the distribution is necessary, a request to the mobile communication system to set a dedicated fixed channel in a public communication network used in the mobile communication system, the dedicated fixed channel being fixed exclusively for the public wireless system. The management apparatus includes an information transmission unit configured to transmit the status information to the mobile communication system to distribute the status information to the mobile communication terminal via the dedicated fixed channel. The communication management apparatus includes a first reception unit configured to receive the status information and a request for distribution of the status information from the management apparatus. The communication management apparatus includes: a setting unit configured to set the dedicated fixed channel in the public communication network in response to the request, the dedicated fixed channel being fixed exclusively for the public wireless system; and a transmission unit configured to transmit the status information to the mobile communication terminal via the dedicated fixed channel. The mobile communication terminal includes: a second reception unit configured to receive the status information via the dedicated fixed channel; and a presentation unit configured to present information representing a radio wave receivable area regarding a wireless station where communication is currently available in the public wireless system according to the wireless communication status represented by the status information.

A management method according to a third aspect of the present disclosure includes the following three steps that are executed by a management apparatus configured to manage communication in a public wireless system including at least one wireless station that executes wireless communication with a wireless terminal. The first step is a step of determining whether or not distribution of status information to a mobile communication terminal via a mobile communication system that provides a mobile communication service to the mobile communication terminal is necessary, the status information representing a wireless communication status in the public wireless system. The second step is a step of transmitting, when the management apparatus determines that the distribution is necessary, a request to the mobile communication system to set a dedicated fixed channel in a public communication network used in the mobile communication system, the dedicated fixed channel being fixed exclusively for the public wireless system. The third step is a step of transmitting the status information to the mobile communication system to distribute the status information to the mobile communication terminal via the dedicated fixed channel.

A program according to a fourth aspect of the present disclosure is a program for causing a computer to execute the following three steps in a public wireless system including at least one wireless station that executes wireless communication with a wireless terminal. The first step is a step of determining whether or not distribution of status information to a mobile communication terminal via a mobile communication system that provides a mobile communication service to the mobile communication terminal is necessary, the status information representing a wireless communication status in the public wireless system. The second step is a step of transmitting, when it is determined that the distribution is necessary, a request to the mobile communication system to set a dedicated fixed channel in a public communication network used in the mobile communication system, the dedicated fixed channel being fixed exclusively for the public wireless system. The third step is a step of transmitting the status information to the mobile communication system to distribute the status information to the mobile communication terminal via the dedicated fixed channel.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Figure 1:
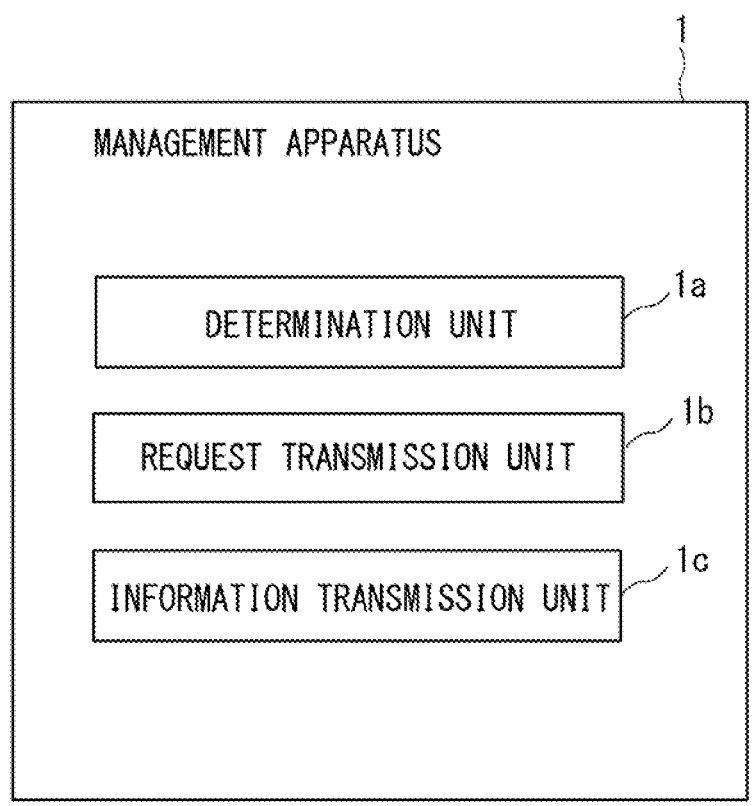
FIG. 1 is a block diagram illustrating a configuration example of a management apparatus according to a first example embodiment.

Hereinafter, example embodiments will be described with reference to the drawings. In the example embodiments, the same or like elements are represented by the same reference numerals, and the description thereof will not be appropriately repeated.

<First Example Embodiment>

Figure 2:
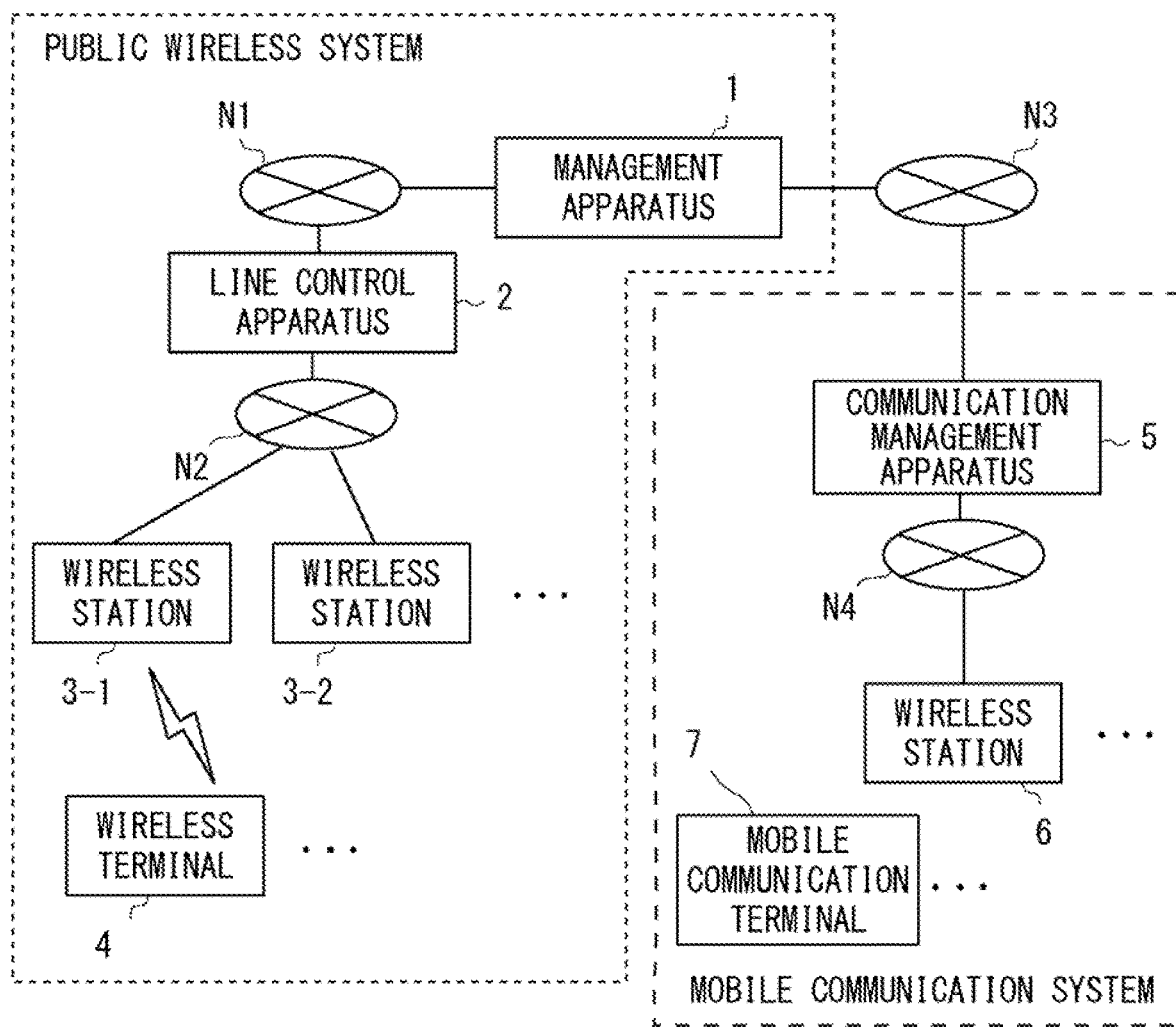
FIG. 2 is a schematic diagram illustrating a configuration example of a communication system including the management apparatus of FIG. 1.
Figure 3:
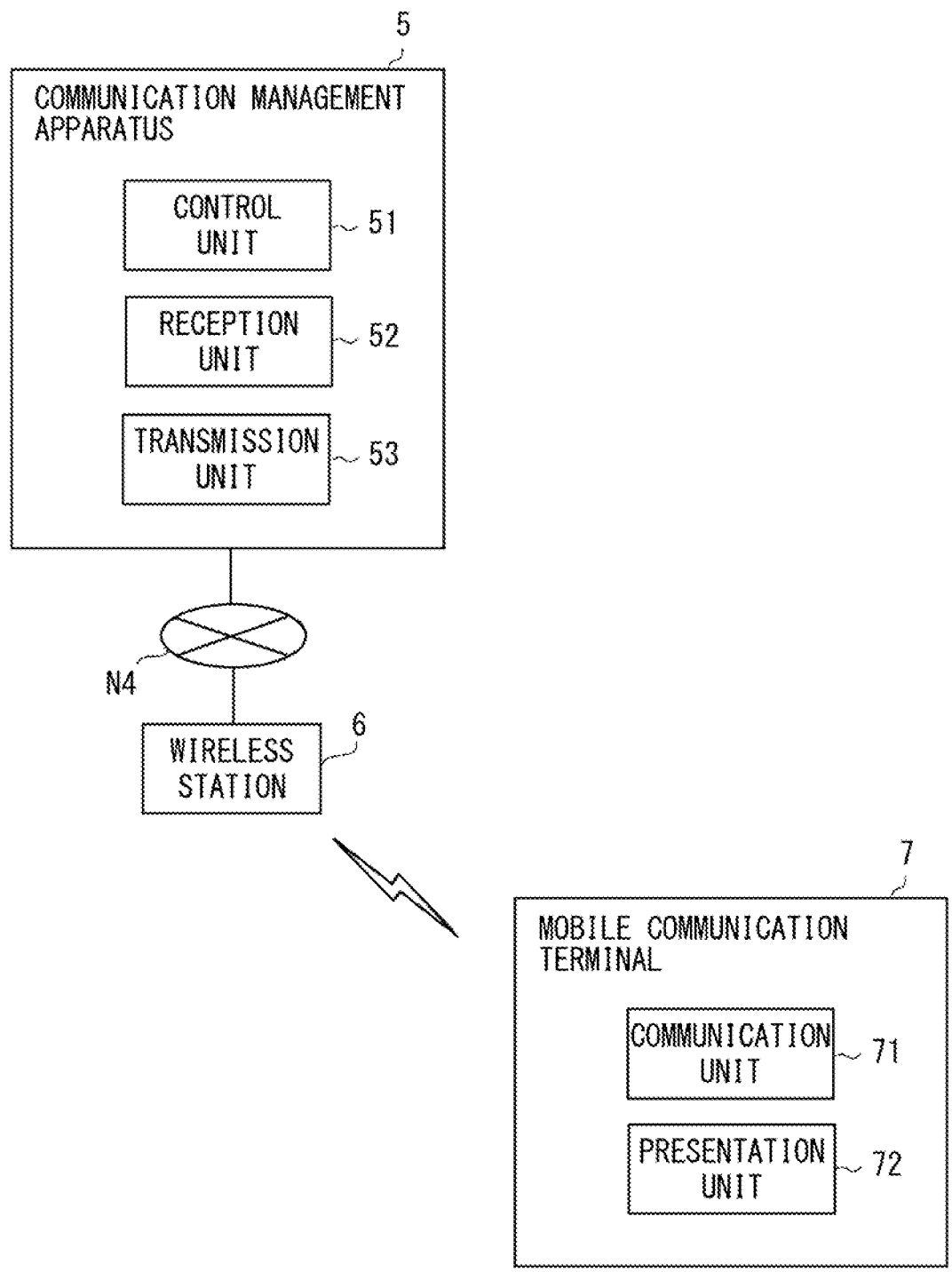
FIG. 3 is a block diagram illustrating a configuration example of a mobile communication system in the communication system of FIG. 2.

A first example embodiment will be described with reference to FIGS. 1 to 3. FIG. 1 is a block diagram illustrating a configuration example of a management apparatus according to the first example embodiment. FIG. 2 is a schematic diagram illustrating a configuration example of a communication system including the management apparatus of FIG. 1. FIG. 3 is a block diagram illustrating a configuration example of a mobile communication system in the communication system of FIG. 2.

As illustrated in FIG. 1, a management apparatus 1 according to the example embodiment includes a determination unit 1a, a request transmission unit 1b, and an information transmission unit 1c described below. The management apparatus 1 manages communication in a public wireless system. This public wireless system is a system that is independently operated by a public organization such as municipalities, and each such system is operated by one or a plurality of public organizations. Hereinafter, in order to simplify the description, basically, a public wireless system that is operated by one public organization will be described.

As shown in FIG. 2, the public wireless system includes, in addition to the management apparatus 1, a line control apparatus 2, one or a plurality of wireless stations 3-1, 3-2, . . . (hereinafter, referred to as "wireless station 3" when described without being distinguished from each other), and one or a plurality of wireless terminals 4.

The wireless terminal 4 is a wireless device that configures the public wireless system, and executes wireless communication with the wireless station 3 in a predetermined communication manner. The wireless terminal 4 is a mobile wireless device such as a handy type or an in-vehicle type, and a plurality of wireless terminals 4 may be present. The wireless terminal 4 can transmit and receive information of a voice call or the like to and from another wireless terminal 4, and can also receive a notification transmitted from the management apparatus 1 side through the line control apparatus 2, the notification being given by a voice, character information, image information, or the like output from the public organization. Hereinafter, the description will be made assuming that this notification is given from the management apparatus 1. The public wireless system can include a wireless terminal as a semi-fixed station that is provided in a facility of the public organization. In this case, the wireless terminal as the semi-fixed station can transmit the notification output from the public organization to the wireless terminal 4.

The wireless station 3 is, for example, a base station or a relay station, and is connected to the line control apparatus 2 via a network N2 as a part of a wireless facility in the public wireless system. The line control apparatus 2 is connected to the management apparatus 1 via a network N1, is connected to the wireless station 3 via the network N2, and executes line control relating to communication between the management apparatus 1 and the wireless terminal 4 or communication between the wireless terminals 4. The management apparatus 1 manages communication in the public wireless system including the wireless terminal 4 and the wireless station 3. The management apparatus 1 can include a function of the line control apparatus 2. In this case, the wireless station 3 is directly connected to the management apparatus 1 via a network.

The determination unit 1a of the management apparatus 1 determines whether or not distribution of status information representing a wireless communication status (operational status) in the public wireless system is necessary. This distribution is distribution to a mobile communication terminal 7 via a mobile communication system that provides a mobile communication service to the mobile communication terminal 7.

FIG. 2 illustrates an example of the mobile communication system. This mobile communication system can include a communication management apparatus 5, one or a plurality of wireless stations 6 that are connected to the communication management apparatus 5 via a network N4, and a plurality of mobile communication terminals 7. The communication management apparatus 5 manages communication in the mobile communication system that provides the mobile communication service to the mobile communication terminal 7. The wireless station 6 is a part of a wireless facility in the mobile communication system, is a base station or a relay station for communication with the mobile communication terminal 7, and is connected to the communication management apparatus 5 via the network N4. The mobile communication terminal (mobile communication terminal apparatus) 7 is, for example, a mobile phone (including a so-called smartphone), a portable PC (Personal Computer), or an information terminal apparatus.

The mobile communication terminal 7 and the wireless terminal 4 have different names merely in order to distinguish them from each other. The wireless terminal 4 and the mobile communication terminal 7 are different from each other in the systems to which they belong. Communication methods, communication frequency bands, communication time periods, or reference numerals for identifying communication may be different between the systems.

For the distribution, the management apparatus 1 is connected to the mobile communication system via a public communication network (network), and is connected to the communication management apparatus 5 via a network N3 in the example of FIG. 2.

The status information can include information representing a wireless communication availability status in each of the wireless stations 3 as the wireless communication status. For example, the status information can include area information which indicates a radio wave receivable area where the wireless terminal 4 can communicate with the wireless station 3 in the public wireless system. The status information can include, as the wireless communication availability status, not only the radio wave receivable area (communication available area) but also information such as a communication unavailable area or the number of available communication lines.

When the determination unit 1a determines that the distribution is necessary, the request transmission unit 1b transmits a request described below to the mobile communication system. The request is a request to set a dedicated fixed channel in the public communication network (in the network N4 or in the network N4 and the wireless station 6) used in the mobile communication system, the dedicated fixed channel being fixed exclusively for the public wireless system.

Together with or separately from (after) the request, the information transmission unit 1c transmits the status information to the mobile communication system to distribute the status information to the mobile communication terminal 7 via the dedicated fixed channel. In the example of FIG. 2, when the determination unit 1a determines that the distribution is necessary, the request transmission unit 1b transmits the request to the communication management apparatus 5 via the network N3, and the information transmission unit 1c transmits the status information to the communication management apparatus 5 via the network N3.

The management apparatus 1 includes: a control unit (not illustrated) that controls the entire apparatus; and a communication unit that communicates with the line control apparatus 2 or the communication management apparatus 5. The determination unit 1a is mounted as a part of the control unit, and the request transmission unit 1b and the information transmission unit 1c are mounted as a part of the communication unit and the control unit (unit that causes the communication unit to transmit information). The control unit is implemented, for example, by a CPU (Central Processing Unit), a working memory, and a nonvolatile storage apparatus or the like that stores a program (for example, firmware). This control unit can be implemented to include an integrated circuit. In addition, the communication unit can be configured with a communication interface for connection to the networks N1 and N3.

The line control apparatus 2 includes: a control unit (not illustrated) that controls the entire apparatus; and a communication unit that communicates with the management apparatus 1 or the wireless station 3.

The wireless station 3 includes: a control unit (not illustrated) that controls the entire apparatus; and a wireless communication unit including an antenna, a modulator, a demodulator, and an amplifier according to a communication method thereof.

The wireless terminal 4 includes: a control unit (not illustrated) that controls the entire apparatus; and a wireless communication unit including an antenna, a modulator, a demodulator, and an amplifier according to a communication method thereof.

In order to execute a process corresponding to the request, the communication management apparatus 5 includes a control unit 51, a reception unit 52, and a transmission unit 53 as illustrated in FIG. 3. The control unit 51 manages mobile communication in the mobile communication system that provides the mobile communication service to the mobile communication terminal 7. The control unit 51 can be a control unit that controls the entire communication management apparatus 5. The control unit 51 is implemented, for example, by a CPU, a working memory, and a nonvolatile storage apparatus or the like that stores a program (for example, firmware), and can be implemented to include an integrated circuit.

The reception unit 52 receives the status information representing the wireless communication status in the public wireless system and the request to distribute the status information from the management apparatus 1. In response to the request received by the reception unit 52, the control unit 51 sets the channel (dedicated fixed channel) in the public communication network used in the mobile communication system, the channel being fixed exclusively for the public wireless system to which the request is transmitted.

The transmission unit 53 transmits the status information received by the reception unit 52 to the mobile communication terminal 7. Here, the transmission unit 53 transmits the status information to the mobile communication terminal 7 via the set dedicated fixed channel. In addition, the mobile communication terminal 7 to which the status information is transmitted is designated based on information (terminal specific information) such as a phone number or the like on the management apparatus 1 side. The information (terminal specific information) regarding the designation can include the request. In this case, the management apparatus 1 may store the information regarding the designation before the request. Alternatively, the management apparatus 1 can also be configured such that the mobile communication terminal 7 designates the public wireless system and transmits the request for the status information and the transmission unit 53 of the communication management apparatus 5 that receives the request returns the status information received in advance to the mobile communication terminal 7.

The communication management apparatus 5 includes a communication unit (not illustrated) that communicates with the management apparatus 1 or the wireless station 6, and this communication unit can be configured by allowing the reception unit 52 and the transmission unit 53 to have the function of the communication unit.

The wireless station 6 includes: a control unit (not illustrated) that controls the entire apparatus; and a wireless communication unit including an antenna, a modulator, a demodulator, and an amplifier according to a communication method thereof.

As illustrated in FIG. 3, the mobile communication terminal 7 includes a communication unit 71 and a presentation unit 72. The communication unit 71 communicates with the mobile communication system that provides the mobile communication service. That is, the communication unit 71 can communicate with the communication management apparatus 5 via the wireless station 6. The communication unit 71 includes an antenna, a modulator, a demodulator, and an amplifier according to a communication method thereof. The communication unit 71 receives the status information representing the wireless communication status in the public wireless system via the dedicated fixed channel set in the mobile communication system as described above. That is, although not illustrated in the drawing, the communication unit 71 includes a reception unit that receives the status information via the dedicated fixed channel.

The presentation unit 72 includes at least either a display apparatus or a voice output apparatus. The presentation unit 72 presents information representing the radio wave receivable area regarding the wireless station 3 where communication is currently available in the public wireless system according to the wireless communication status represented by the received status information. This presentation can be made in the form of a guidance for guiding a user to the radio wave receivable area.

The mobile communication terminal 7 includes a control unit (not illustrated) that controls the entire apparatus. This control unit is implemented, for example, by a CPU, a working memory, and a nonvolatile storage apparatus or the like that stores a program (for example, firmware), and can be implemented to include an integrated circuit. The control that is executed by the control unit can include a control that executes an output instruction to the display apparatus or the like in the presentation unit 72.

As described above, the communication system according to the example embodiment includes a public wireless system and a mobile communication system that is a public communication system, in which the public wireless system and the mobile communication system work together to notify the wireless communication status such as the communication available area relating to the wireless station 3 to the mobile communication terminal 7.

Accordingly, according to the example embodiment, in FIG. 2, even in a situation where the wireless terminal 4 cannot communicate with one wireless station 3 (for example, the wireless station 3-1), the communication availability status with the public wireless system can be obtained from the mobile communication terminal 7. As a result, a user of the wireless terminal 4 can be guided to an area (for example, the wireless communication available area for the wireless station 3-2) where wireless communication is available in the wireless terminal 4.

Basically, the case where one public wireless system is used has been described above. By identifying a plurality of public wireless systems to distinguish the public wireless systems from each other, the same can be applied to the common mobile communication system as in the case where one public wireless system is used. That is, in a case where the communication system according to the example embodiment is associated with a plurality of public wireless systems, when the request is received from each of the public wireless systems, the dedicated fixed channel associated with each of the public wireless systems may be set.

In addition, basically, the description is made assuming that one mobile communication system is used. A plurality of mobile communication systems can be provided. For example, the mobile communication system is constructed per mobile network operator (carrier). In this case, the dedicated fixed channel is set in each of the mobile communication systems of the carriers to which the mobile communication terminals 7 belong, and the status information can be distributed to the mobile communication terminals 7 via the dedicated fixed channels.

<Second Example Embodiment>

In the second example embodiment, differences from the first example embodiment will be mainly described with reference to FIGS. 4 to 14. The description of the same configurations will not be repeated, and the various examples described in the first example embodiment can be applied to the second example embodiment.

Figure 4:
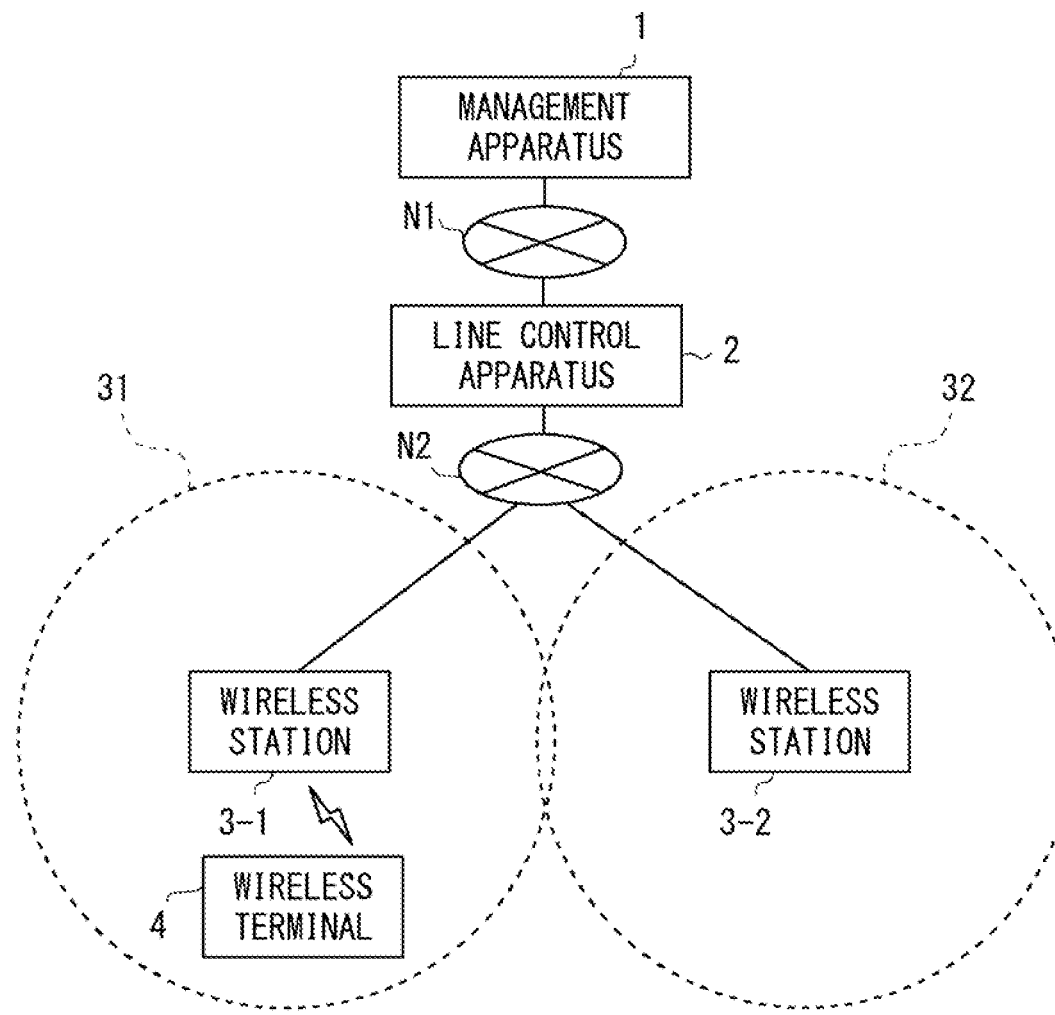
FIG. 4 is a schematic diagram illustrating a configuration example of a public wireless system in a communication system according to a second example embodiment.

First, the public wireless system in the communication system according to the example embodiment will be described with reference to FIG. 4. FIG. 4 is a schematic diagram illustrating a configuration example of the public wireless system in the communication system according to the example embodiment.

As illustrated in FIG. 4 the public wireless system according to the example embodiment includes the management apparatus 1, the line control apparatus 2 connected to the management apparatus 1 via the network N1, the wireless stations 3-1 and 3-2 connected to the line control apparatus 2 via the network N2, and the wireless terminal 4. In order to simplify the description, two wireless stations 3 and one wireless terminal 4 are illustrated. However, as described in the first example embodiment, the number of the wireless stations 3 can be three or more, and the number of the wireless terminals 4 can be two or more.

This wireless system is in a communication connection state illustrated in FIG. 4. That is, in the communication connection state, the wireless terminal 4 is present in a wireless communication available area 31 of the wireless station 3-1. Therefore, the wireless terminal 4 can execute wireless communication with the wireless station 3-1. In addition, in the communication connection state, the wireless terminal 4 is present outside a wireless communication available area 32 of the wireless station 3-2. Therefore, the wireless terminal 4 cannot execute wireless communication with the wireless station 3-2.

In the example embodiment, even when line failure occurs from the communication connection state in a line where the wireless terminal 4 is connected to the line control apparatus 2 via the wireless station 3-1 such that communication is unavailable, the user of the wireless terminal 4 is guided such that communication via the wireless station 3-2 is available. An example of this series of processes will be described with reference to FIGS. 5 to 11.

Figure 5:
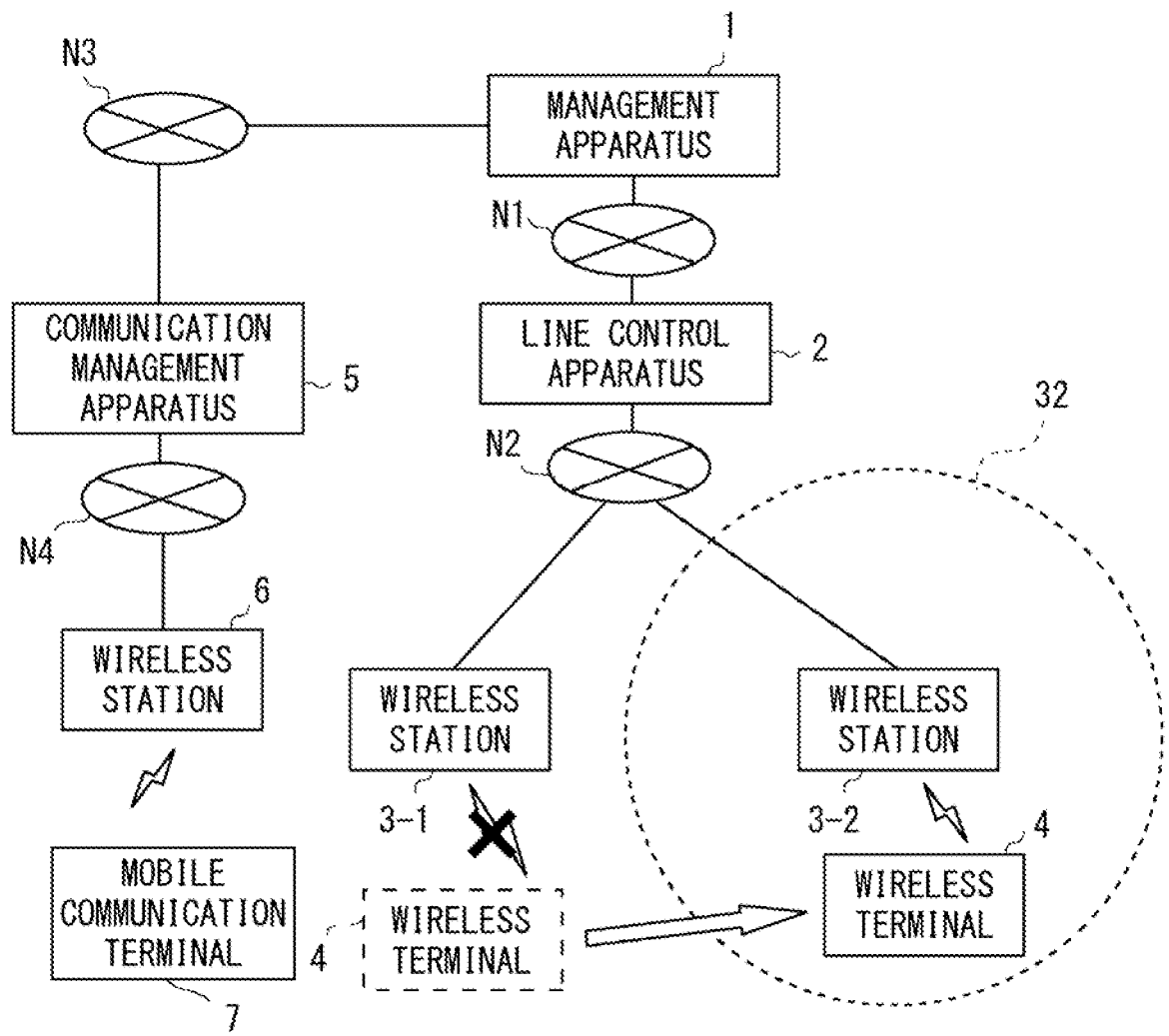
FIG. 5 is a schematic diagram illustrating a wireless communication procedure that is executed by the communication system according to the second example embodiment when a wireless terminal cannot execute wireless communication with a wireless station in the public wireless system of FIG. 4.
Figure 6:
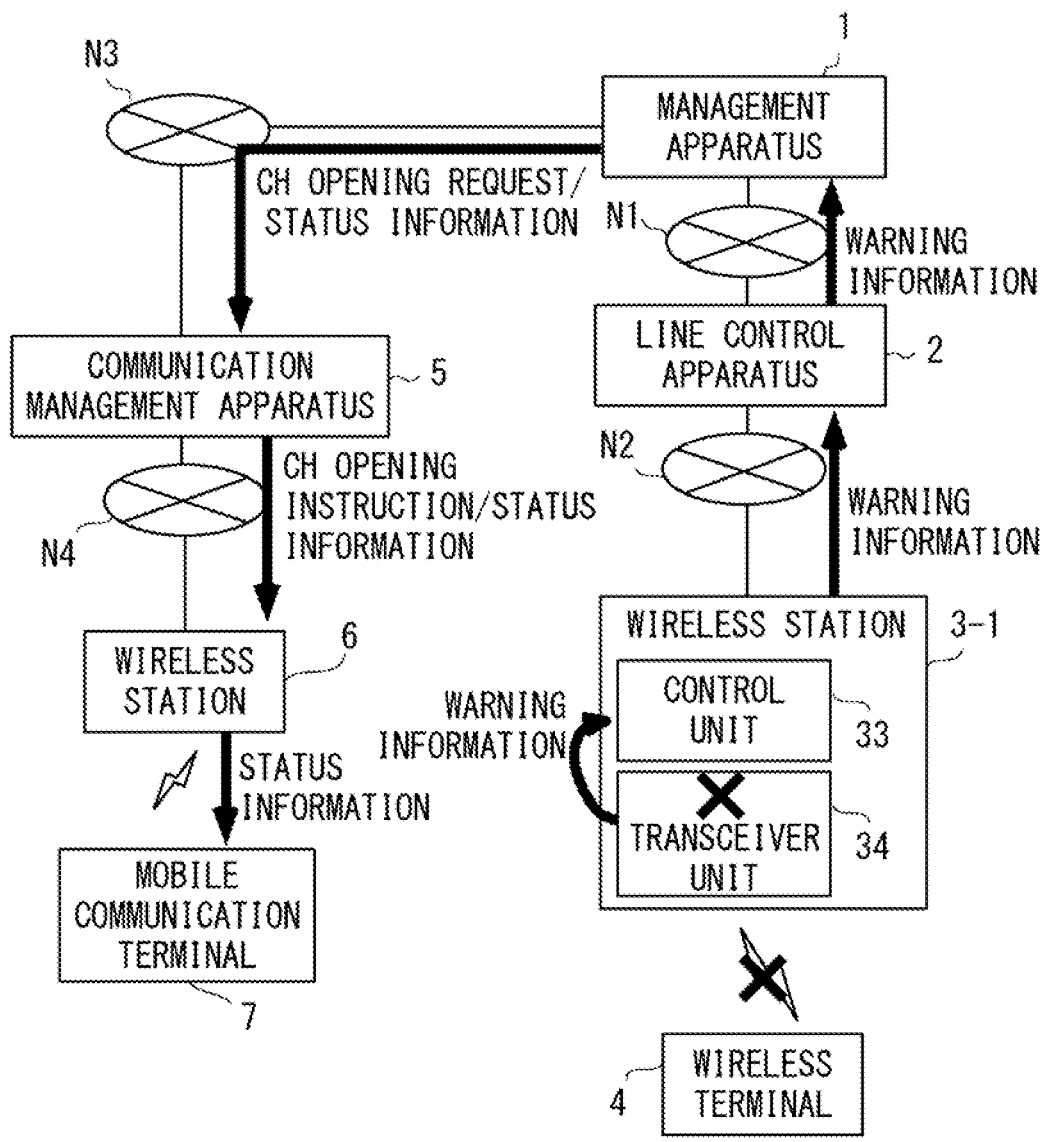
FIG. 6 is a schematic diagram for describing an example of the wireless communication procedure of FIG. 5 in the communication system according to the second example embodiment.
Figure 7:
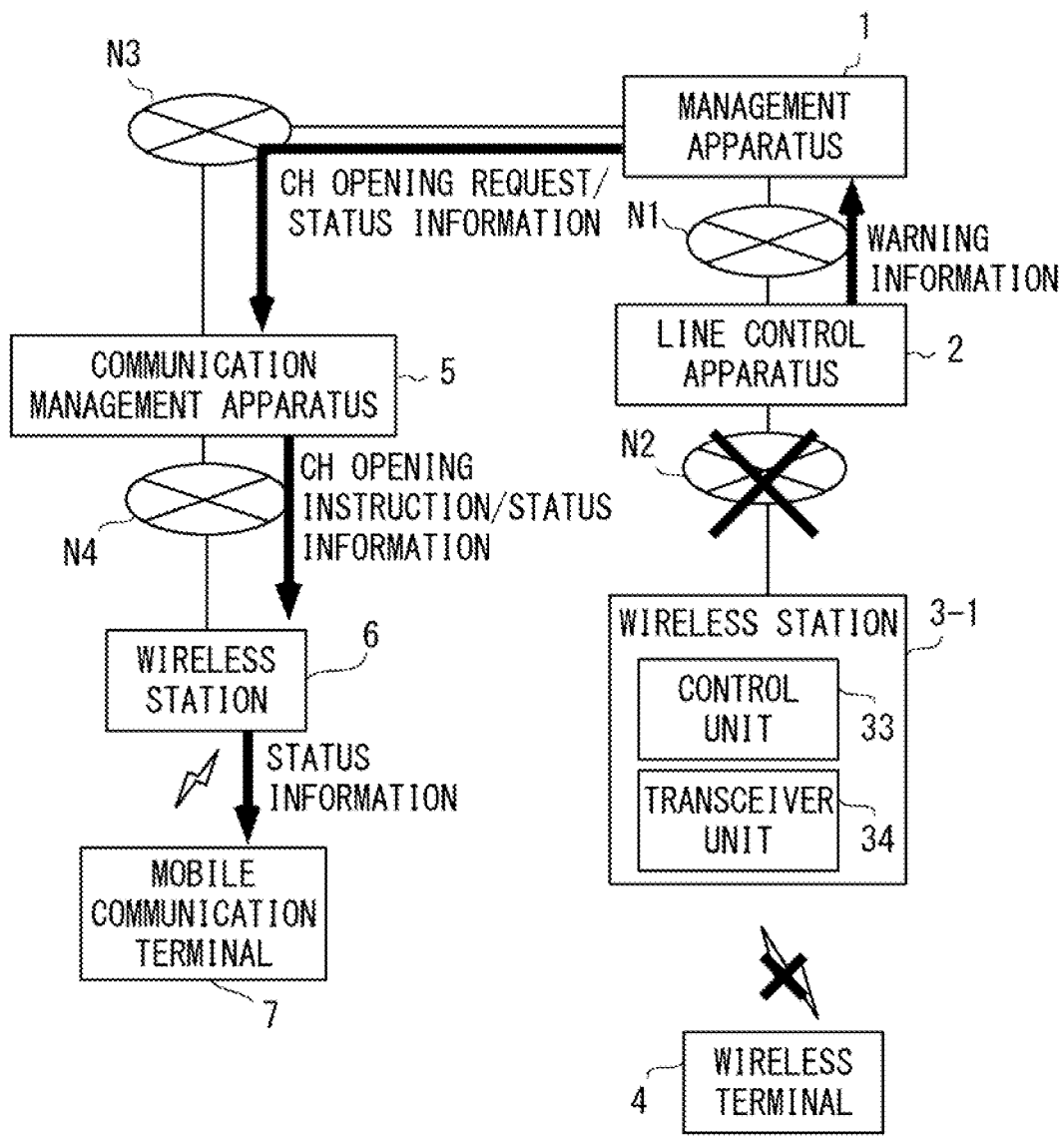
FIG. 7 is a schematic diagram for describing another example of the wireless communication procedure of FIG. 5 in the communication system according to the second example embodiment.
Figure 8:
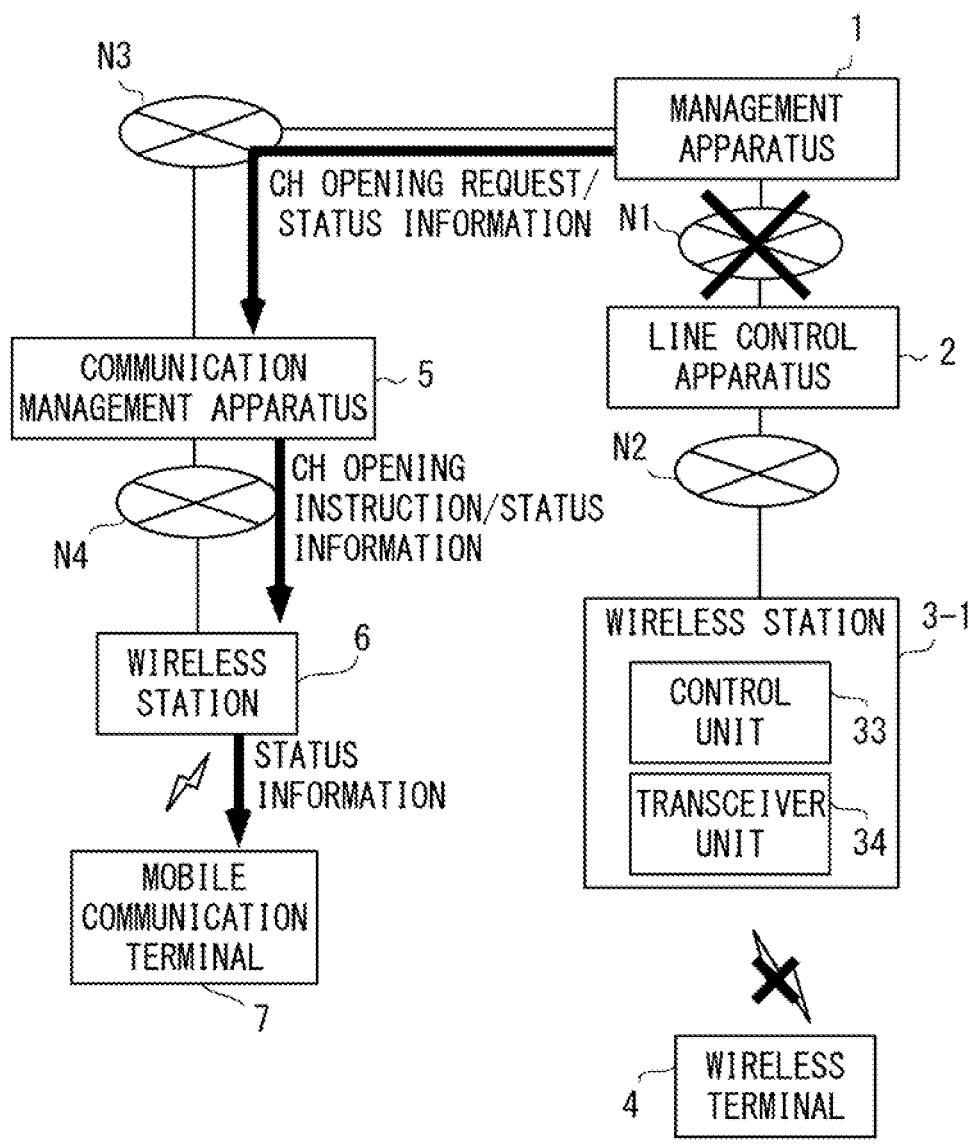
FIG. 8 is a schematic diagram for describing still another example of the wireless communication procedure of FIG. 5 in the communication system according to the second example embodiment.

FIG. 5 is a schematic diagram illustrating a wireless communication procedure that is executed by the communication system according to the example embodiment when the wireless terminal 4 cannot execute wireless communication with the wireless station 3-1 in the public wireless system of FIG. 4. FIGS. 6 to 8 are schematic diagrams illustrating examples of the wireless communication procedure of FIG. 5 in the communication system according to the second example embodiment, in which the examples are different from each other.

As illustrated in FIG. 5, the wireless terminal 4 cannot communicate with the wireless station 3-1 due to some failure. This failure state may occur, for example, due to breakdown of a transceiver unit 34 in the wireless station 3-1 as illustrated in FIG. 6. In this example, the wireless station 3-1 includes: a control unit 33 that controls the entire apparatus; and the transceiver unit 34 that executes wireless communication based on the control of the control unit 33.

As illustrated in FIG. 6, when failure caused by the transceiver unit 34, for example, breakdown of the transceiver unit 34 occurs, the control unit 33 detects the failure, for example, by receiving warning information representing communication failure of the transceiver unit 34 from the transceiver unit 34 or by detecting that there is no response from the transceiver unit 34, and transmits the warning information to the line control apparatus 2. The line control apparatus 2 receives the warning information and transmits the warning information to the management apparatus 1. These pieces of warning information transmitted and received between the apparatuses can be the same but may be different from each other as long as the wireless station 3-1 where communication is unavailable can be specified with the information. This point can also be applied to the following other examples. For example, depending on the detected failure, the warning information can include information (hereinafter, referred to as corresponding information, for example, log information) regarding the results corresponding to the wireless station 3-1 and the line control apparatus 2.

The management apparatus 1 that receives the warning information transmits an opening request to open the dedicated fixed channel and the status information corresponding to the warning information to the communication management apparatus 5. In this case, the status information can be, for example, information representing that communication is unavailable in the wireless station 3-1, the corresponding information, or information representing that communication is available in the wireless station 3-2 from which the warning information is not received and representing its wireless communication available area. The communication management apparatus 5 receives the opening request and the status information, transmits an instruction to the wireless station 6 to open the dedicated fixed channel for the public wireless system managed by the management apparatus 1, and transmits the received status information to the wireless station 6. The wireless station 6 receives the instruction to open the dedicated fixed channel and transmits the status information to the mobile communication terminal 7.

The dedicated fixed channel can include a frequency band, a time period, a code, and a spatial domain secured such that communication is preferentially available, and can be a channel where simultaneous communication with a plurality of mobile communication terminals 7 owned by a respective plurality of users is available. For example, using network slicing, that is, a mechanism for virtually slicing the network, the dedicated fixed channel can be configured (opened) as a dedicated region (dedicated channel) for the target public wireless system. Alternatively, the dedicated fixed channel can be opened, for example, by using a multimedia broadcast multicast service (MBMS) function introduced by LTE (Long Term Evolution) Release 9. MBMS is an abbreviation for Multimedia Broadcast and Multicast Service. MBMS is a transmission method of simultaneously distributing information to all of the mobile communication terminals 7 (UE: User Equipment) in a specific area with a common bearer. By using this function of MBMS, information regarding an independent wireless network (for example, communication facility/area status) can be distributed in a fixed manner until the independent wireless network is restored. In addition, a channel for a specific space can be set using directivity of an antenna. The method of configuring the dedicated fixed channel is not limited to these examples.

In addition, as described in the first example embodiment, the transmission of the status information to the mobile communication terminal 7 can be executed by designating information (terminal specific information) such as a phone number or IMEI of the mobile communication terminal 7. In this case, the terminal specific information can be transmitted, for example, from the management apparatus 1 side. IMEI is an abbreviation for International Mobile Equipment Identifier. In addition, when the transmission of the status information to the mobile communication terminal 7 is executed by designating the information (terminal specific information) such as the phone number of the mobile communication terminal 7, the user can receive the status information by SMS without any operation such as setting operations of the mobile communication terminal 7. SMS is an abbreviation for Short Message Service. Alternatively, instead of transmitting the status information to the mobile communication terminal 7, as described above in the first example embodiment, the status information can be transmitted by getting access from the mobile communication terminal 7 side to a location where the status information is stored. This way, a method of distributing the status information is not limited to the use of SMS as a service of exchanging messages between mobile phones by using phone numbers as destinations, and various methods such as notification on a Web site can be adopted.

In addition, the status information that is distributed via the dedicated fixed channel include not only the line status of the independent infrastructure network (public wireless system) but also information representing a facility available time or the like regarding the wireless station 3 (for example, the wireless station 3-2) where wireless communication is available. The facility available time can include a continuous operating time of the system infrastructure facility such as the wireless station 3 or the line control apparatus 2 or an operating time period when the system infrastructure facility is intermittently operated.

The line status can include an operating status (normal/abnormal), a connection status, and a line congestion prediction of each of the wireless stations 3. When the connection status represents that communication is available on the line between the wireless station 3 and the line control apparatus 2, it can be seen that the communication between the management apparatus 1 and the wireless station 3 (including, for example, a call with a control desk, a command desk, or the like which is a higher-level apparatus of the management apparatus 1) is available but the next communication is unavailable. That is, it can be seen that the communication between the wireless station 3 and the wireless terminal 4 is unavailable.

In addition, when the connection status shows that communication is unavailable on the line between the wireless station 3 and the line control apparatus 2, the wireless station 3 operates alone, and prediction information representing that only a return call between the wireless terminals 4 under the control of the wireless station 3 is available can be acquired.

The line congestion prediction can be obtained from the number of the wireless terminals 4 (that is, the number of standby mobile stations) waiting under the control of the wireless station 3. By notifying the line congestion prediction to the user, the user can predict the degree of connection difficulty of the line to each wireless station 3. Based on the prediction, the user can determine whether to move to the wireless communication available area of another wireless station 3 or to wait.

In either case, as the user who uses the mobile communication terminal 7, the user who uses the wireless terminal 4 can be presented with the status information (line information such as the wireless communication available area) regarding the public wireless system from the mobile communication system, and can check the status information. As illustrated in FIG. 5, the user who owns the wireless terminal 4 moves to the wireless communication available area 32 of the wireless station 3-2 based on the status information presented by the mobile communication system such that the wireless terminal 4 can return to the public wireless system. That is, the wireless terminal 4 and the wireless station 3-2 can enter a communication available state.

As described above in the example of FIG. 6, when the warning information (information regarding failure or the like) representing that wireless communication is unavailable in the wireless station 3-1 included in the public wireless system is received, the management apparatus 1 determines that the distribution of the status information is necessary. The determination unit 1a of FIG. 1 executes this determination. The management apparatus 1 transmits, as the status information, information representing a radio wave receivable area regarding the wireless station 3-2 where communication is currently available in the public wireless system other than the wireless station 3-1 relating to the warning information. The information transmission unit 1c of FIG. 1 executes this transmission.

In addition, the failure state may occur due to communication failure (line failure) in the network N2 between the line control apparatus 2 and the wireless station 3-1 and breakdown of the control unit 33 of the wireless station 3-1 or a communication unit (not illustrated) for connection to the network N2 as illustrated in FIG. 7. In this example, the line control apparatus 2 detects line disconnection to the wireless station 3-1 and transmits the warning information to the management apparatus 1. Subsequently, the same process as that of the example of FIG. 6 is executed. Finally, as illustrated in FIG. 5, the user who owns the wireless terminal 4 moves to the wireless communication available area 32 of the wireless station 3-2 presented to the user such that the wireless terminal 4 can return to the public wireless system.

As described above in the example of FIG. 7, when the warning information (failure information on a halfway path) representing that communication with the wireless station 3-1 included in the public wireless system is unavailable is received, the management apparatus 1 determines that the distribution of the status information is necessary. The determination unit 1a of FIG. 1 executes this determination. The management apparatus 1 transmits, as the status information, information representing a radio wave receivable area regarding the wireless station 3-2 where communication is currently available in the public wireless system connected to a path different from the path relating to the warning information. The information transmission unit 1c of FIG. 1 executes this transmission. In addition, although the example of transmitting the information representing the radio wave receivable area as the status information is described above, information representing an area where wireless communication is unavailable can also be transmitted.

In the examples of FIGS. 6 and 7, the opening request of the dedicated fixed channel is transmitted from the management apparatus 1 to the communication management apparatus 5. However, the apparatus from which the opening request is transmitted is not particularly limited. For example, the opening request may be directly transmitted from the line control apparatus 2 to the communication management apparatus 5.

In addition, the failure state described above may occur due to other factors such as communication failure of the network N1 between the management apparatus 1 and the line control apparatus 2 or breakdown of the line control apparatus 2 as illustrated in FIG. 8. In this example, the management apparatus 1 detects line disconnection to the line control apparatus 2. Based on this detection, the management apparatus 1 determines that wireless communication using the public wireless system including the wireless stations 3-1 and 3-2 under the control of the line control apparatus 2 is unavailable. In this case, the management apparatus 1 transmits an opening request to open the dedicated fixed channel and the status information corresponding to the warning information to the communication management apparatus 5. For example, when a line control apparatus belonging to a second public wireless system is connected to the management apparatus 1, the status information includes information representing a wireless communication available area of a wireless station under the control of the line control apparatus and information (a frequency band, a time period, or a reference numeral) relating to wireless communication. As a result, finally, the user who owns the wireless terminal 4 moves to the wireless communication available area of the wireless station presented to the user and can connect the wireless terminal 4 to the second public wireless system with reference to the information relating to wireless communication.

In the examples of FIG. 8, the opening request of the dedicated fixed channel is transmitted from the management apparatus 1 to the communication management apparatus 5. However, the apparatus from which the opening request is transmitted is not particularly limited. For example, when the line control apparatus 2 does not break and communication failure occurs in the network N1, the opening request is directly transmitted from the line control apparatus 2 to the communication management apparatus 5.

Alternatively, the communication management apparatus 5 detects line disconnection to the line control apparatus 2 and determines that the opening request is received, and the dedicated fixed channel can also be automatically opened. In this case, the communication management apparatus 5 may store in advance information required to open the dedicated fixed channel, for example, information representing the wireless communication available area of the wireless station regarding the line control apparatus 2 or the other line control apparatus.

As described above in the example of FIG. 8, when warning information representing the occurrence of a disaster that disables wireless communication in the wireless stations 3-1 and 3-2 included in the public wireless system is received in the public wireless system (for example, the management apparatus 1), the management apparatus 1 executes the following determination. That is, the management apparatus 1 determines that the distribution of the status information is necessary. The determination unit 1a of FIG. 1 executes this determination. The management apparatus 1 transmits, as the status information, information representing a radio wave receivable area regarding a wireless station where communication is currently available in the public wireless system other than the wireless stations 3-1 and 3-2 relating to the warning information. The information transmission unit 1c of FIG. 1 executes this transmission. In addition, although the example of transmitting the information representing the radio wave receivable area as the status information is described above, information representing an area where wireless communication is unavailable can also be transmitted.

Figure 9:
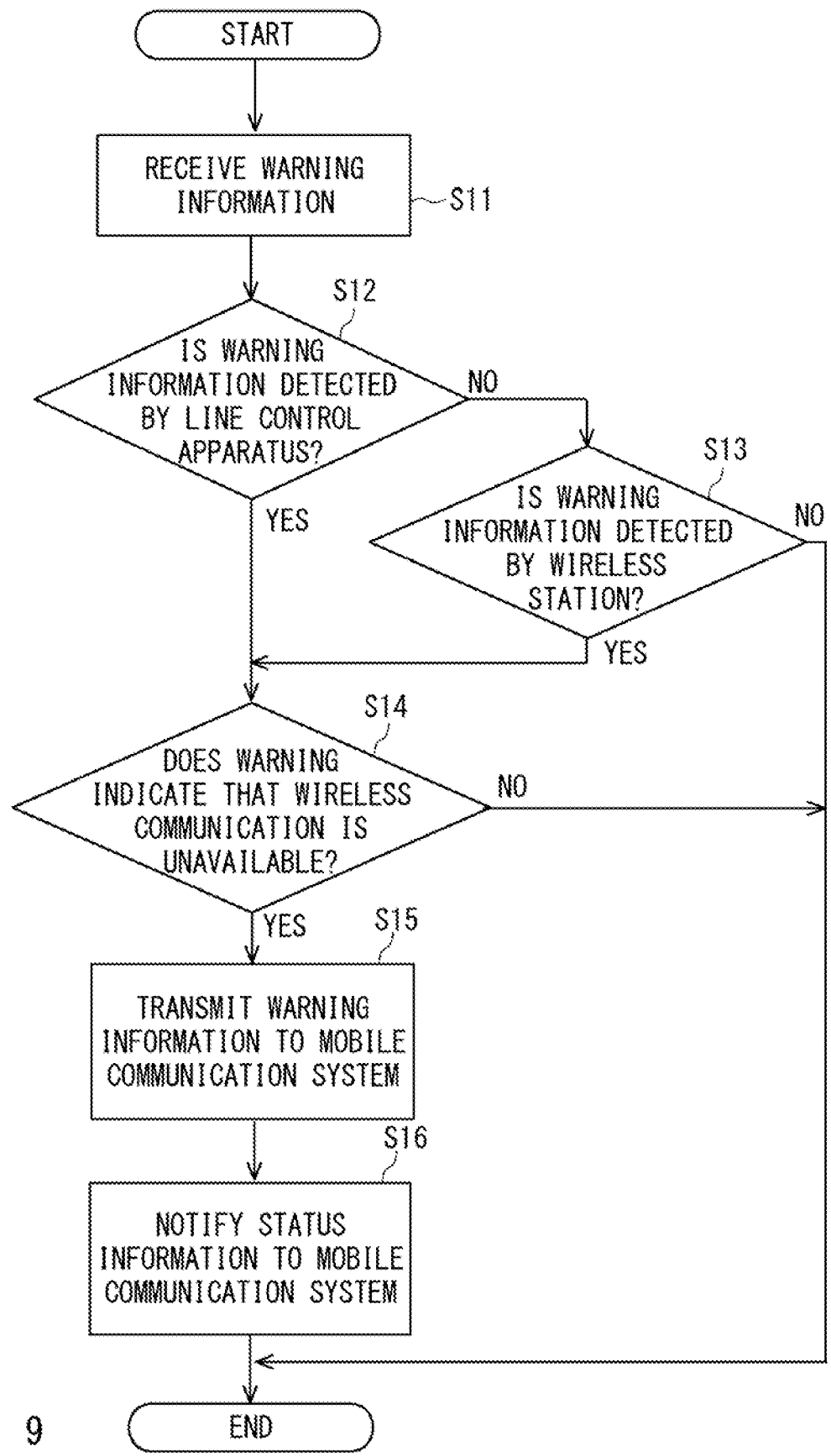
FIG. 9 is a flowchart for describing a process example of a management apparatus of a public wireless system in the communication system according to the second example embodiment.
Figure 10:
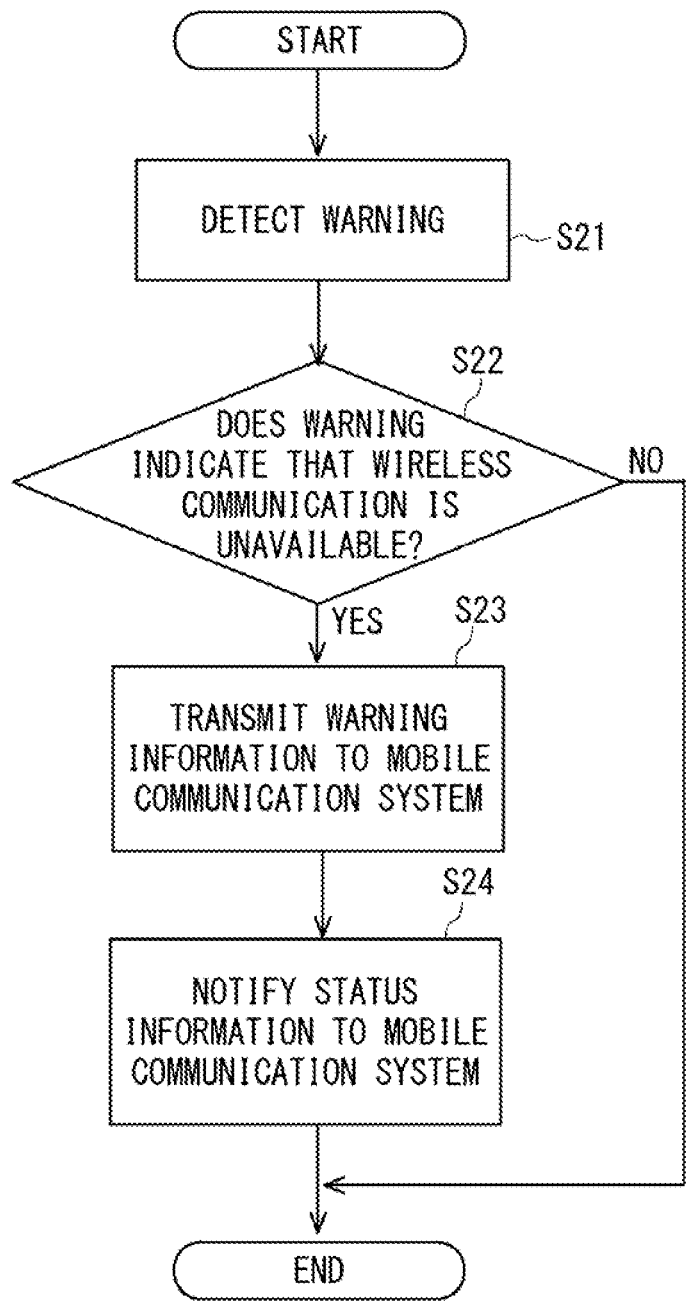
FIG. 10 is a flowchart for describing another process example of the management apparatus of the public wireless system in the communication system according to the second example embodiment.

Here, a process example (example of a channel opening request sequence) in the management apparatus 1 in response to the reception or detection of the warning information described above will be described with reference to FIGS. 9 and 10. FIG. 9 is a flowchart illustrating one process example of the management apparatus 1 in the wireless system. FIG. 10 is a flowchart illustrating another process example of the management apparatus 1 in the wireless system.

The process example applied to the example of FIGS. 6 and 7 will be described with reference to FIG. 9. In this case, the management apparatus 1 receives the warning information from the line control apparatus 2 (Step S11), and determines whether or not the warning information is detected by the line control apparatus 2 (Step S12). When NO is determined in Step S12, the management apparatus 1 determines whether or not the warning information is detected by the wireless station (Step S13). When NO is determined in Step S13, the process ends. When YES is determined in Step S12 and YES is determined in Step S13, the management apparatus 1 determines whether or not the warning indicates that wireless communication is unavailable based on the warning information (Step S14). When NO is determined in Step S14, the process ends. The order of Step S12 and Step S13 may be interchanged.

When YES is determined in Step S14, the management apparatus 1 transmits the warning information to the mobile communication system as the opening request of the dedicated fixed channel (Step S15), notifies the status information (Step S16), and ends the process. Steps S15 and S16 may be performed at the same time.

The process example applied to the example of FIG. 8 will be described with reference to FIG. 10. In this case, the management apparatus 1 detects failure on a halfway path such as line disconnection to the network N1 as the warning (Step S21), and determines whether or not the warning indicates that wireless communication is unavailable based on the detection result (Step S22). When NO is determined in Step S22, the process ends. When YES is determined in Step S22, the management apparatus 1 transmits the warning information to the mobile communication system as the opening request of the dedicated fixed channel (Step S23), notifies the status information (Step S24), and ends the process. Steps S23 and S24 may be performed at the same time.

A described above in Step S15 of FIG. 9 and Step S23 of FIG. 10, the management apparatus 1 can transmit the warning information as the request to set (open) the dedicated fixed channel. The request transmission unit 1b of FIG. 1 can execute this transmission.

FIGS. 9 and 10 illustrate the examples of a channel opening sequence in the management apparatus 1. However, these examples are merely exemplary, and the channel opening sequence is not limited thereto as long as the channel opening request can be transmitted to the mobile communication system based on information representing whether or not the wireless facility included in the public wireless system (the wireless station 3 or the line control apparatus 2) can operate (operation information).

The communication management apparatus 5 can open the dedicated fixed channel in response to the request from the management apparatus 1 as described above, and can also be configured to close (end) the dedicated fixed channel as described below. In the mobile communication system, by opening/closing the dedicated fixed channel in response to a request from a public organization (for example, a public municipality) that is operated by the wireless system other than the request from the management apparatus 1, the process of opening/closing the dedicated fixed channel can also be executed. Alternatively, in the mobile communication system, an emergency alert such as earthquake information, flooding information, or large-scale fire information can be received, and the dedicated fixed channel regarding the corresponding public wireless system can also be opened/closed in response to the emergency alert. If the mobile communication terminal 7 side can receive the status information by SMS without any particular operation, it is not necessary to pay attention to the opening or closing of the dedicated fixed channel.

Hereinabove, the description is made assuming that the information relating to warning is obtained from any of the management apparatus 1, the line control apparatus 2, and the wireless station 3. The information relating to warning can also be obtained from the user of the wireless terminal 4. Hereinafter, this example will be described.

The user of the wireless terminal 4 can use the mobile communication terminal 7 used by the user to transmit the status information in the wireless station 3 by uplink data transmission using the public communication network of the mobile communication system. As a configuration for the transmission, the management apparatus 1 includes a reception unit that receives another status information representing the wireless communication status in the wireless station 3 from the mobile communication terminal 7 via the mobile communication system. The determination unit 1a determines whether or not distribution of the status information is necessary based on the other status information.

For example, by connecting the mobile communication terminal 7 and the wireless terminal 4 using a near field communication method such as Wifi (registered trademark) or Bluetooth (registered trademark) and executing polling from the mobile communication terminal 7 side, the uplink data can be acquired from the communication management apparatus 5 and can be delivered to the management apparatus 1. The uplink data can include, for example, a station number (ID), RSSI information, single mode/loopback mode, or a battery remaining amount of the standby wireless station 3, or a battery remaining amount of the wireless terminal 4. Here, RSSI is an abbreviation for Received Signal Strength Indicator. In addition, the information regarding the battery remaining amount of the wireless station 3 can be used for estimating the operating hours of the wireless station 3, and the battery remaining amount of the wireless terminal 4 can be used for estimating the maximum operating hours of the wireless terminal 4.

As a result, the wireless communication status of the wireless station 3 (for example, the wireless station 3 distant from a control office included in or connected to the management apparatus 1) that cannot be identified from the management apparatus 1 side can be updated based on the information from the wireless station 3 side. That is, the management apparatus 1 can understand the wireless communication available area with higher reliability.

Figure 11:
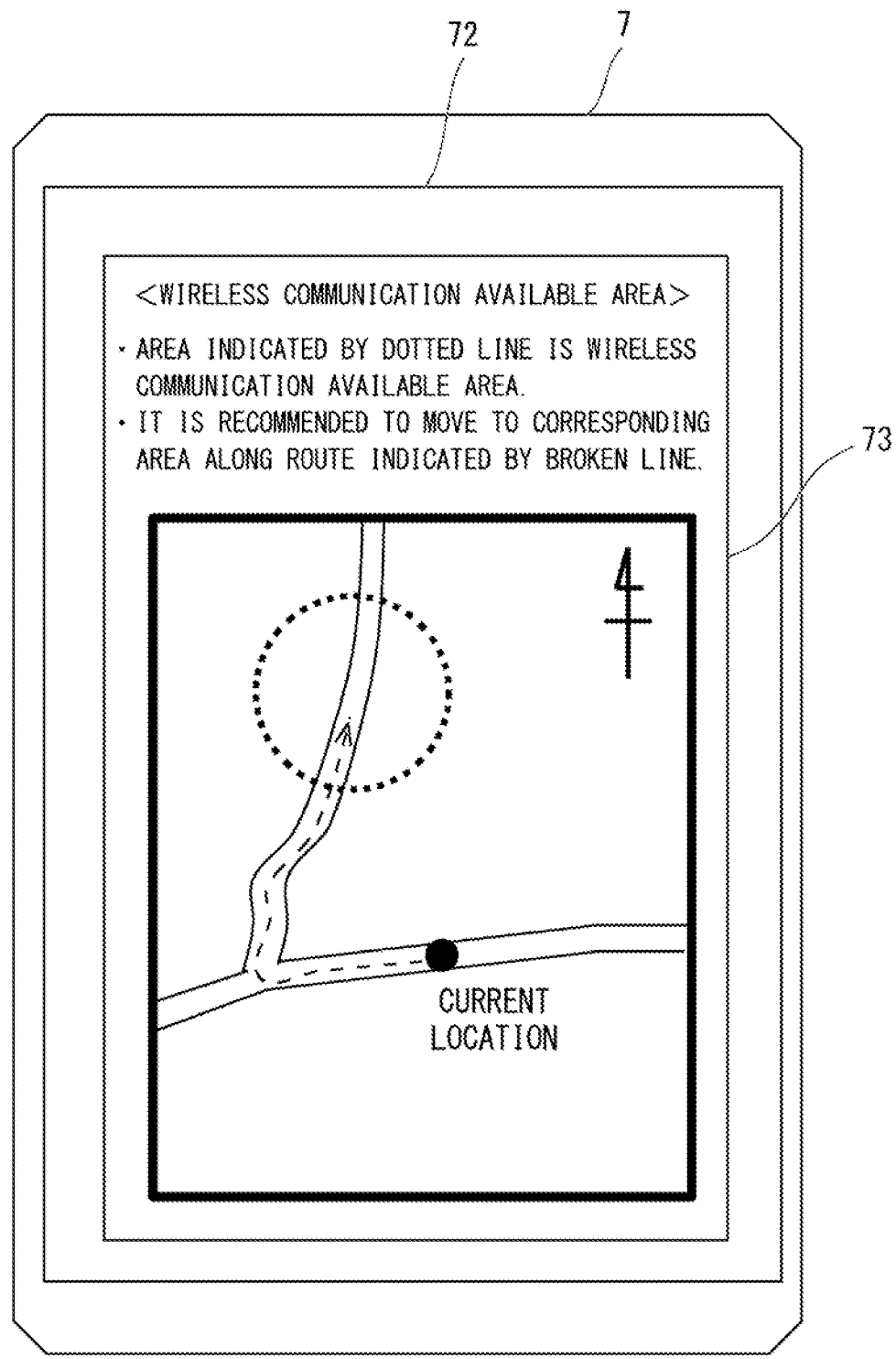
FIG. 11 is a schematic diagram illustrating an example of status information displayed on a mobile communication terminal in the communication system according to the second example embodiment.

Next, an example of presenting the status information in the mobile communication terminal 7 will be described with reference to FIG. 11. FIG. 11 is a schematic diagram illustrating an example of the status information displayed on the mobile communication terminal 7 in the communication system according to the example embodiment.

As illustrated in FIG. 11, the mobile communication terminal 7 can include a display unit as the presentation unit 72, and the display unit can display the information representing the wireless communication available area as information 73. As illustrated by the information 73, the information presented on the mobile communication terminal 7 can include not only the wireless communication available area as character information but also the distributed information and position information that are plotted on pre-stored map data.

This position information can be estimated and acquired from, for example, GNSS (Global Navigation Satellite System), standby information (information based on a communication history and position registration information) in the wireless station 6, and imaging information obtained by a camera, or the like mounted on the mobile communication terminal 7. GNSS is a collective term for satellite positioning systems such as GPS (Global Positioning System), GLONASS (Global Navigation Satellite System), Galileo, and the quasi-zenith satellite system. Here, the quasi-zenith satellite system is QZSS.

In addition, as illustrated by the information 73, the information presented on the mobile communication terminal 7 desirably includes a route from the current location of the mobile communication terminal 7, and can explicitly include a direction or a moving distance. This route is a return route to the independent communication infrastructure network as the public wireless system, and can be the shortest route that satisfies the following conditions as a condition example of route selection. In one example of the conditions, a route through which the user cannot pass is excluded using a hazard map or a real-time disaster status. In another example of the conditions, a route through which the user cannot pass is excluded due to the size of a vehicle on which the wireless terminal 4 is mounted or that is used by the user of the wireless terminal 4.

In addition, in an application example of the status information, when the wireless communication available area has a limit to the operating time period, this limit can be transmitted as the status information. In this case, in an example of the conditions, presentation of a route where communication with a communication infrastructure such as the wireless station 6 is unavailable at the estimated time of arrival of the user of the wireless terminal 4 is excluded. In addition, a route to be excluded can also be determined in consideration of the battery remaining amount of the wireless terminal 4.

As described above, in the example embodiment, the public wireless system and the public communication system can work together to notify the wireless communication available area. This notification is given by preparing the dedicated fixed channel for each of public organizations in the public communication network in a state where wireless communication is unavailable or is estimated to be unavailable in one wireless station, that is, in case of emergency. This way, in the example embodiment, the operational status of the public wireless system (independent communication infrastructure) such as the wireless communication available area is distributed to the mobile communication terminal 7, and the user of the wireless terminal 4 as the user of the mobile communication terminal 7 can understand the operational status of the public wireless system to which the user belongs. Accordingly, in the example embodiment, the user moves to the wireless communication available area and can execute wireless communication with the wireless terminal 4.

Figure 12:
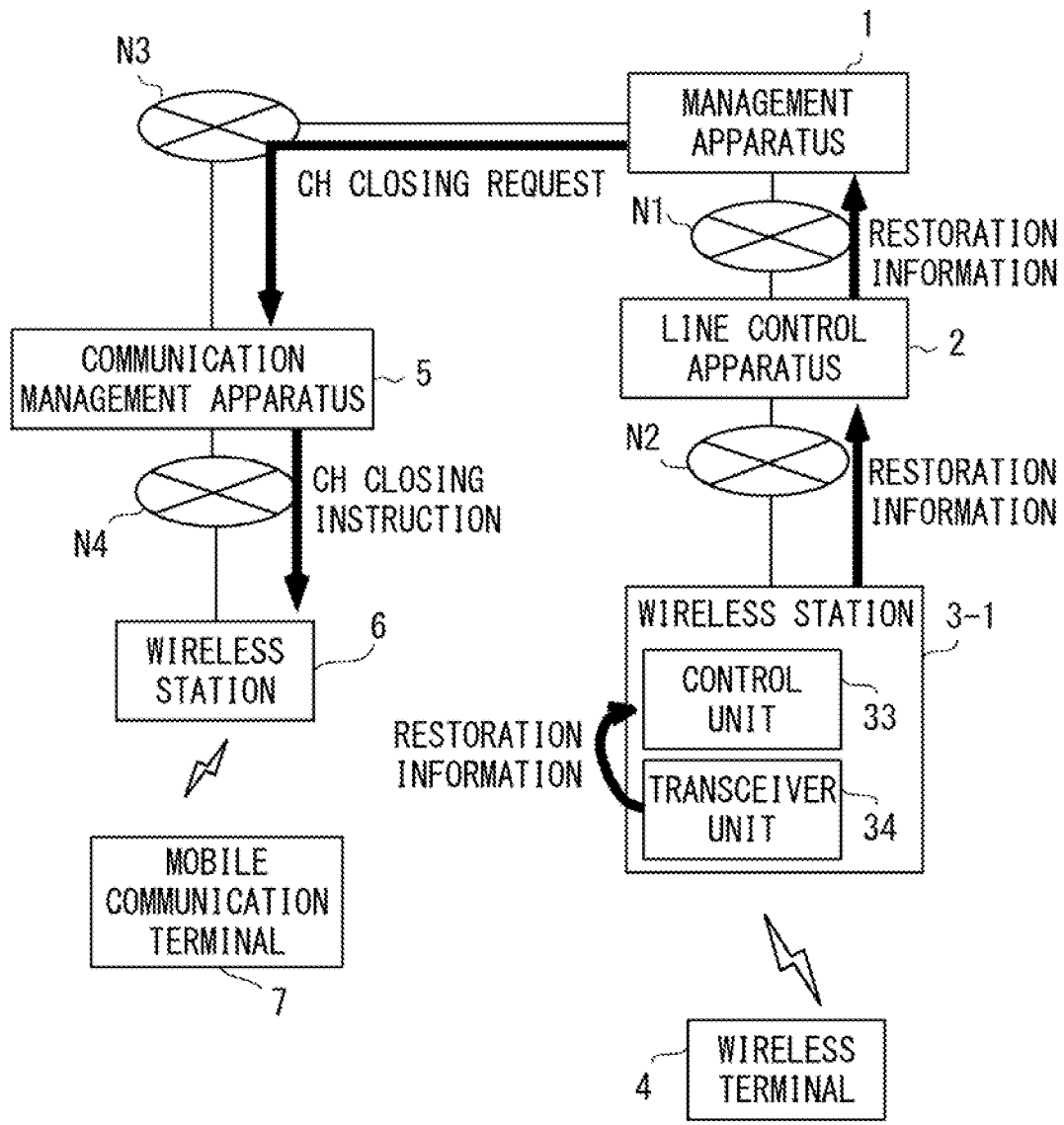
FIG. 12 is a schematic diagram for describing an example of a restoration procedure when wireless communication is restored from a disabled state of the wireless terminal of the public wireless system of FIG. 4 in the communication system according to the second example embodiment.

Next, in the various examples described above, a process when failure or the like is resolved will be described with reference to FIGS. 12 to 14. FIG. 12 is a schematic diagram illustrating an example of a restoration procedure when wireless communication is restored from a disabled state of the wireless terminal 4 of the public wireless system of FIG. 4 in the communication system according to the example embodiment.

As illustrated in FIG. 12, when communication is restored from failure caused by the transceiver unit 34, for example, breakdown of the transceiver unit 34 is recovered, the control unit 33 detects that communication is available in the transceiver unit 34, for example, by receiving restoration information from the transceiver unit 34, and transmits the restoration information to the line control apparatus 2. The line control apparatus 2 receives the restoration information and transmits the restoration information to the management apparatus 1. These pieces of restoration information transmitted and received between the apparatuses can be the same but may be different from each other as long as the wireless station 3-1 where communication is available can be specified with the information.

The management apparatus 1 that receives the restoration information transmits a request to the communication management apparatus 5 to close the dedicated fixed channel. The communication management apparatus 5 receives this closing request, and transmits an instruction to the wireless station 6 to close the dedicated fixed channel for the public wireless system managed by the management apparatus 1. The wireless station 6 receives the instruction and closes the dedicated fixed channel. In addition, by transmitting the status information in response to the closing request such that the status information can be presented in the mobile communication terminal 7, the user who watches this presentation can determine an area where the user can execute communication in the wireless terminal 4 based on the status information.

In the examples of FIG. 12, the closing request of the dedicated fixed channel is transmitted from the management apparatus 1 to the communication management apparatus 5. However, the apparatus from which the closing request is transmitted is not particularly limited. For example, the closing request is directly transmitted from the line control apparatus 2 to the communication management apparatus 5. In addition, here, the example of resolution corresponding to FIG. 6 is described. However, in the example or the like of resolution corresponding to FIG. 7 or 8, the process can be executed in the same manner.

Here, a process example (example of a channel closing request sequence) in the management apparatus 1 in response to the reception or detection of the restoration information described above will be described with reference to FIGS. 13 and 14. FIG. 13 is a flowchart illustrating one process example during the restoration of the management apparatus 1 in the wireless system. FIG. 14 is a flowchart illustrating another process example during the restoration of the management apparatus 1 in the public wireless system.

The process example applied to the example of FIG. 12 will be described with reference to FIG. 13. In this case, the management apparatus 1 receives the restoration information from the line control apparatus 2 (Step S31), and determines whether or not wireless the restoration makes wireless communication available based on the restoration information (Step S32). When NO is determined in Step S32, the process ends. When YES is determined in Step S32, the management apparatus 1 transmits the restoration information to the mobile communication system as the closing request of the dedicated fixed channel (Step S33), and ends the process. This process example can be applied to the example of resolution corresponding to FIG. 7.

The process example applied to the example of resolution corresponding to FIG. 8 will be described with reference to FIG. 14. In this case, the management apparatus 1 detects failure resolution on a halfway path, for example, line reconnection to the network N1 as the restoration (Step S41), and determines whether or not wireless the restoration makes wireless communication available based on the detection result (Step S42). When NO is determined in Step S42, the process ends. When YES is determined in Step S42, the management apparatus 1 transmits the restoration information to the mobile communication system as the closing request of the dedicated fixed channel (Step S43), and ends the process.

Figure 13:
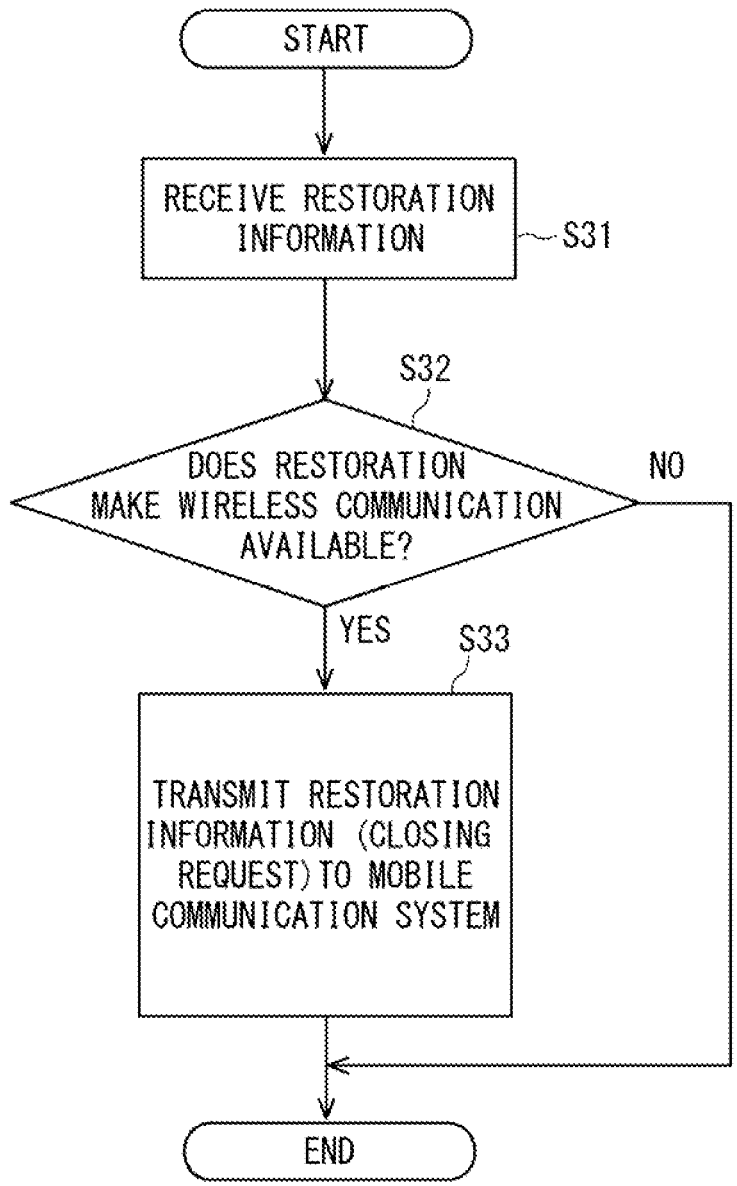
FIG. 13 is a flowchart for describing a process example during restoration in the management apparatus of the public wireless system in the communication system according to the second example embodiment.
Figure 14:
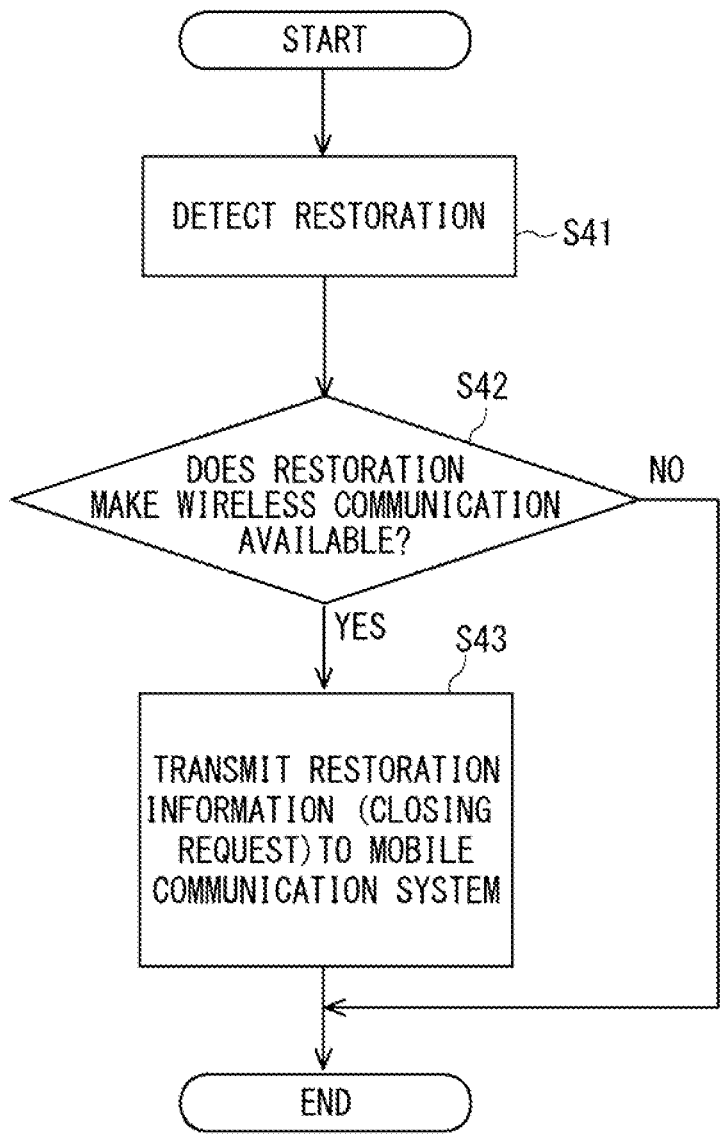
FIG. 14 is a flowchart for describing another process example during restoration in the management apparatus of the public wireless system in the communication system according to the second example embodiment.

A described above in Step S33 of FIG. 13 and Step S43 of FIG. 14, The management apparatus 1 transmits the restoration information as a request (closing request) to cancel the setting of the dedicated fixed channel. The request transmission unit 1b of FIG. 1 executes this transmission.

FIGS. 13 and 14 illustrate the examples of a channel closing sequence in the management apparatus 1. However, these examples are merely exemplary, and the channel closing sequence is not limited thereto as long as the channel closing request can be transmitted to the mobile communication system based on the operation restoration information of the wireless facility included in the public wireless system.

As illustrated in FIGS. 12 to 13, when the determination unit 1a determines that the distribution of the status information is unnecessary after determining that the distribution of the status information is necessary, the management apparatus 1 can transmit the cancelation request to request the setting of the dedicated fixed channel. As described above, the request transmission unit 1b executes this transmission. For example, when the dedicated fixed channel is set and subsequently restoration of communication relating to a wireless station 3-1 relating to the setting of the dedicated fixed channel is detected, the request transmission unit 1b transmits the detection result as a cancelation request to cancel the setting of the dedicated fixed channel.

As described above, the management apparatus 1 according to the example embodiment determines whether or not the distribution of the status information of the independent communication infrastructure is necessary based on the status of the warning of the independent communication infrastructure such that the request to open or close the dedicated fixed channel of the public communication network of the mobile communication system can be automatically transmitted. The conditions of the opening/closing request can be the following conditions as described above with reference to FIGS. 6 to 14 but, of course, are not limited thereto.

Examples of the conditions of the opening request can include a case where the stop (not only breakdown or failure but also during maintenance) of the operation of the independent communication infrastructure or the wireless facility is detected. For example, the determination can be made when the warning is output from the wireless station 3 or the line control apparatus 2 or based on the status information or the like. In addition, examples of the conditions of the opening request can include a case where the connection state between the management apparatus 1 and the line control apparatus 2 in the independent communication infrastructure is monitored (health check) and the connection is disconnected.

Examples of the conditions of the closing request can include a case where the restart (not only the resolution of breakdown or failure but also at the end of maintenance) of the operation of the independent communication infrastructure or the wireless facility is detected. For example, the determination can be made when the warning from the wireless station 3 or the line control apparatus 2 is cancelled or based on the status information or the like. In addition, examples of the conditions of the closing request can include a case where the connection state between the management apparatus 1 and the line control apparatus 2 in the independent communication infrastructure is monitored (health check) and the connection is restored.

Hereinabove, basically, the example where communication between the wireless terminal 4 and the wireless station 3-1 is unavailable has been described. As simply described in the example of FIG. 8, even when the communication possibly becomes to be unavailable, the management apparatus 1 may transmit the opening request to open the dedicated fixed channel to the communication management apparatus 5 and may execute the subsequent process as described above.

Next, an operation example of the communication system according to the example embodiment will be described using the example of the wireless system.

A first operation example is described, where a 260 MHz band digital disaster prevention administration wireless system is operated as the wireless system, and when failure occurs in a standby base station (corresponding to the wireless station 3), and the line is restored.

First, it is assumed that, in a state where a standby mobile station A (the wireless terminal 4) is present in a base station A (the wireless station 3) as a dedicated line of a municipality A, a disaster (such as earthquake or flooding) occurs and causes failure to occur in the base station A. At this time, the mobile station A cannot be in the standby mode due to the failure of the base station A such that communication with a higher-level system is unavailable.

In response to the request from the management apparatus 1 that is operated by the municipality A, the communication management apparatus 5 opens the dedicated fixed channel for the public telephone network, and notifies the operational status of the public wireless system that is operated by the municipality A to the mobile communication terminal 7 used by a user of the mobile station A by SMS via this dedicated fixed channel. Next, the user of the mobile station A receives SMS with the mobile communication terminal 7, and checks that communication is unavailable in the base station A and communication is available in a base station B adjacent to the base station A. At this time, the mobile communication terminal 7 automatically plots position information acquired by itself on map data based on the acquired status information and the position information, and presents the shortest route to the base station B area where communication can be restored as soon as possible to the independent infrastructure network. The user moves to a service area of the base station B along this route, and the mobile station A returns to the standby line under the control of the base station B.

A second operation example is described, where this wireless system is operated as a fire prevention wireless system of a certain fire prevention organization and supports a fire prevention wireless system of another public organization (another fire prevention organization). First, it is assumed that, when a large-scale disaster occurs in an area of a fire prevention organization A, a staff of a fire prevention organization B wants to support a fire prevention wireless system of the fire prevention organization A as a support member of the fire prevention organization A but does not know a frequency and identification number information of the fire prevention organization A.

In this case, in response to the request from the management apparatus 1 that is operated by the fire prevention organization A, the communication management apparatus 5 opens the dedicated fixed channel for the public telephone network, and gives a notification to the mobile communication terminal 7 used by the staff of the adjacent fire prevention organization by SMS via the dedicated fixed channel. Here, various information (frequency information, identification number and the like, and whether or not support is necessary) regarding the fire prevention wireless system operated by the fire prevention organization A are notified by SMS. At this time, the mobile communication terminal 7 automatically plots position information (or position information of a vehicle on which a staff of the fire prevention organization B is riding) acquired by itself on map data based on the acquired status information and the position information, and presents the shortest route to support the fire prevention wireless system of the fire prevention organization A as soon as possible. The staff of the fire prevention organization B moves to a service area of a base station in the fire prevention wireless system of the fire prevention organization A along this route, and secures a standby line under the control of the base station with the mobile station (wireless terminal 4) owned by the staff with reference to the various information (frequency information, identification number and the like, and whether or not support is necessary).

Even when detection of line breakdown or emergency information is not executed as in the second operation example, the communication system according to the example embodiment can be applied.

<Other Example Embodiment>

Figure 15:
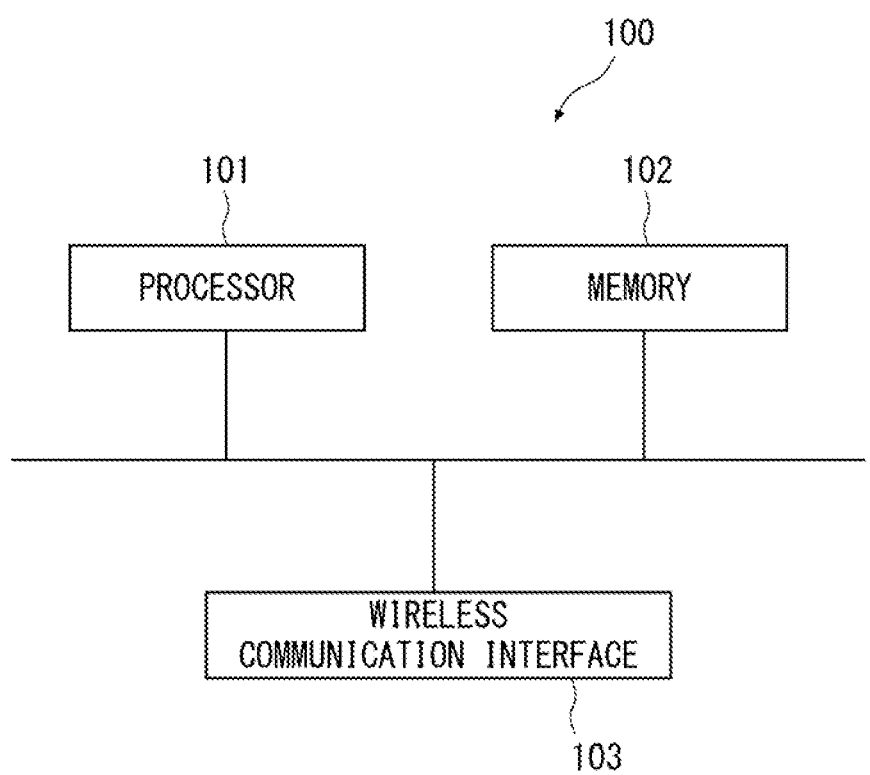
FIG. 15 is a diagram illustrating an example of a hardware configuration included in the apparatus.

Each of the apparatuses (including the wireless terminal 4, the wireless stations 3 and 6, and the mobile communication terminal 7) according to the first and second example embodiments can include the following hardware configuration. FIG. 15 is a diagram illustrating an example of a hardware configuration included in the apparatus.

An apparatus 100 illustrated in FIG. 15 can include a processor 101, a memory 102, and a wireless communication interface 103 and optionally further includes a wired communication interface. In each of the apparatuses, the function of the apparatus can be implemented when the processor 101 loads a program stored in the memory 102 and executes the program in cooperation with the wireless communication interface 103 or the wired communication interface.

Each of the programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and computer memories (such as mask ROM, PROM (programmable ROM), EPROM (erasable PROM), flash ROM, RAM (random access memory), etc.). The program may be provided to Transitory computer readable media can provide the program to a computer via a wired communication line (e.g. electric wires, and optical fibers) or a wireless communication line.

The present disclosure can provide a management apparatus, a communication system, a management method, and a program where, even when a wireless terminal cannot communicate with a wireless station in a public wireless system, a user of the wireless terminal can obtain a communication availability status of the public wireless system.

The first and second embodiments can be combined as desirable by one of ordinary skill in the art.

While the disclosure has been particularly shown and described with reference to embodiments thereof, the disclosure is not limited to these embodiments. It will be understood by those of ordinary skills in the art that various changes in form and details may be made thereafter without originating from the spirit and scope of the present disclosure as defined by the claims.

The whole or part of the exemplary embodiments disclosed above can be described as, but not limited to, the following supplementary notes.

(Supplementary Note 1)

A management apparatus comprising:

a determination unit configured to determine whether or not distribution of status information to a mobile communication terminal via a mobile communication system that provides a mobile communication service to the mobile communication terminal is necessary, the status information representing a wireless communication status in a public wireless system including at least one wireless station that executes wireless communication with a wireless terminal;

a request transmission unit configured to transmit, when the determination unit determines that the distribution is necessary, a request to the mobile communication system to set a dedicated fixed channel in a public communication network used in the mobile communication system, the dedicated fixed channel being fixed exclusively for the public wireless system; and an information transmission unit configured to transmit the status information to the mobile communication system to distribute the status information to the mobile communication terminal via the dedicated fixed channel.

(Supplementary Note 2)

The management apparatus according to Supplementary Note 1, wherein when warning information representing that wireless communication is unavailable in one wireless station included in the public wireless system is received, the determination unit determines that the distribution is necessary, and the information transmission unit transmits, as the status information, information representing a radio wave receivable area regarding a wireless station where communication is currently available in the public wireless system other than the wireless station relating to the warning information.

(Supplementary Note 3)

The management apparatus according to Supplementary Note 1 o 2, wherein when warning information representing that communication with one wireless station included in the public wireless system is unavailable is received, the determination unit determines that the distribution is necessary, and the information transmission unit transmits, as the status information, information representing a radio wave receivable area regarding a wireless station where communication is currently available in the public wireless system other than the wireless station relating to the warning information.

(Supplementary Note 4)

The management apparatus according to any one of Supplementary Notes 1 to 3, wherein when warning information representing an occurrence of a disaster that disables wireless communication in one wireless station included in the public wireless system is received in the public wireless system, the determination unit determines that the distribution is necessary, and the information transmission unit transmits, as the status information, information representing a radio wave receivable area regarding a wireless station where communication is currently available in the public wireless system other than the wireless station relating to the warning information.

(Supplementary Note 5)

The management apparatus according to any one of Supplementary Notes 2 to 4, wherein the request transmission unit transmits the warning information as the request.

(Supplementary Note 6)

The management apparatus according to any one of Supplementary Notes 1 to 5, wherein when the determination unit determines that the distribution is unnecessary after determining that the distribution is necessary, the request transmission unit transmits a cancelation request to cancel a setting of the dedicated fixed channel.

(Supplementary Note 7)

The management apparatus according to any one of Supplementary Notes 2 to 5, wherein when the dedicated fixed channel is set and subsequently restoration of communication relating to a wireless station relating to the setting of the dedicated fixed channel is detected, the request transmission unit transmits the detection result as a cancelation request to cancel the setting of the dedicated fixed channel.

(Supplementary Note 8)

The management apparatus according to any one of Supplementary Notes 1 to 7, further comprising a reception unit configured to receive another status information representing a wireless communication status in the wireless station from the mobile communication terminal via the mobile communication system, wherein the determination unit determines whether or not the distribution is necessary based on the other status information.

(Supplementary Note 9)

A communication management apparatus comprising:

a control unit configured to manage mobile communication in a mobile communication system that provides a mobile communication service to a mobile communication terminal;

a reception unit configured to receive status information representing a wireless communication status in a public wireless system and a request to distribute the status information from a management apparatus that manages communication in the public wireless system including at least one wireless station that executes wireless communication with a wireless terminal; and a transmission unit configured to transmit the status information to the mobile communication terminal, wherein the control unit sets a dedicated fixed channel in a public communication network used in the mobile communication system in response to the request, the dedicated fixed channel being fixed exclusively for the public wireless system, and the transmission unit transmits the status information to the mobile communication terminal via the dedicated fixed channel.

(Supplementary Note 10)

A mobile communication terminal comprising:

a communication unit configured to communicate with a mobile communication system that provides a mobile communication service; and a presentation unit, wherein the communication unit receives status information representing a wireless communication status in the public wireless system via a dedicated fixed channel that is set in the mobile communication system, the dedicated fixed channel being fixed exclusively for a public wireless system including at least one wireless station that executes wireless communication with a wireless terminal, and the presentation unit presents information representing a radio wave receivable area regarding a wireless station where communication is currently available in the public wireless system according to the wireless communication status represented by the status information.

(Supplementary Note 11)

A communication system comprising:

a wireless terminal;

a management apparatus configured to manage communication in a public wireless system including at least one wireless station that executes wireless communication with the wireless terminal;

a mobile communication terminal; and a communication management apparatus configured to manage communication in a mobile communication system that provides a mobile communication service to the mobile communication terminal, wherein the management apparatus includes a determination unit configured to determine whether or not distribution of status information to a mobile communication terminal via the mobile communication system is necessary, the status information representing a wireless communication status in the public wireless system, a request transmission unit configured to transmit, when the determination unit determines that the distribution is necessary, a request to the mobile communication system to set a dedicated fixed channel in a public communication network used in the mobile communication system, the dedicated fixed channel being fixed exclusively for the public wireless system, and an information transmission unit configured to transmit the status information to the mobile communication system to distribute the status information to the mobile communication terminal via the dedicated fixed channel, the communication management apparatus includes a first reception unit configured to receive the status information and a request for distribution of the status information from the management apparatus, a setting unit configured to set the dedicated fixed channel in the public communication network in response to the request, the dedicated fixed channel being fixed exclusively for the public wireless system, and a transmission unit configured to transmit the status information to the mobile communication terminal via the dedicated fixed channel, and the mobile communication terminal includes a second reception unit configured to receive the status information via the dedicated fixed channel, and a presentation unit configured to present information representing a radio wave receivable area regarding a wireless station where communication is currently available in the public wireless system according to the wireless communication status represented by the status information.

(Supplementary Note 12)

A management method in a management apparatus which is configured to manage communication in a public wireless system including at least one wireless station that executes wireless communication with a wireless terminal, the management method comprising:

a step of determining whether or not distribution of status information to a mobile communication terminal via a mobile communication system that provides a mobile communication service to the mobile communication terminal is necessary, the status information representing a wireless communication status in the public wireless system;

a step of transmitting, when the management apparatus determines that the distribution is necessary, a request to the mobile communication system to set a dedicated fixed channel in a public communication network used in the mobile communication system, the dedicated fixed channel being fixed exclusively for the public wireless system; and a step of transmitting the status information to the mobile communication system to distribute the status information to the mobile communication terminal via the dedicated fixed channel.

(Supplementary Note 13)

A communication management method comprising:

a step of receiving in a communication management apparatus, which is configured to manage communication in a mobile communication system that provides a mobile communication service to a mobile communication terminal, status information representing a wireless communication status in a public wireless system and a request to distribute the status information from a management apparatus that manages communication in the public wireless system including at least one wireless station that executes wireless communication with a wireless terminal;

a step of setting in the communication management apparatus, a dedicated fixed channel in a public communication network used in the mobile communication system in response to the request, the dedicated fixed channel being fixed exclusively for the public wireless system; and a step of transmitting in the communication management apparatus, the status information to the mobile communication terminal via the dedicated fixed channel.

(Supplementary Note 14)

An information presentation method comprising:

a step of receiving in a mobile communication terminal, which is configured to communicate with a mobile communication system that provides a mobile communication service, status information representing a wireless communication status in the public wireless system via a dedicated fixed channel that is set in the mobile communication system, the dedicated fixed channel being fixed exclusively for a public wireless system including at least one wireless station that executes wireless communication with a wireless terminal; and a step of presenting in the mobile communication terminal, information representing a radio wave receivable area regarding a wireless station where communication is currently available in the public wireless system according to the wireless communication status represented by the status information.

(Supplementary Note 15)

A program for causing a computer to execute steps in a public wireless system including at least one wireless station that executes wireless communication with a wireless terminal, the steps including:

a step of determining whether or not distribution of status information to a mobile communication terminal via a mobile communication system that provides a mobile communication service to the mobile communication terminal is necessary, the status information representing a wireless communication status in the public wireless system;

a step of transmitting, when it is determined that the distribution is necessary, a request to the mobile communication system to set a dedicated fixed channel in a public communication network used in the mobile communication system, the dedicated fixed channel being fixed exclusively for the public wireless system, and a step of transmitting the status information to the mobile communication system to distribute the status information to the mobile communication terminal via the dedicated fixed channel.

(Supplementary Note 16)

A program for causing a computer to execute steps in a public wireless system that manages communication in a mobile communication system that provides a mobile communication service to a mobile communication terminal, the steps including:

a step of receiving status information representing a wireless communication status in a public wireless system and a request to distribute the status information from a management apparatus that manages communication in the public wireless system including at least one wireless station that executes wireless communication with a wireless terminal;

a step of setting a dedicated fixed channel in a public communication network used in the mobile communication system in response to the request, the dedicated fixed channel being fixed exclusively for the public wireless system; and a step of transmitting the status information to the mobile communication terminal via the dedicated fixed channel.

(Supplementary Note 17)

A program for causing a computer to execute steps, the computer being mounted on a mobile communication terminal configured to communicate with a mobile communication system that provides a mobile communication service, the steps including:

a step of receiving status information representing a wireless communication status in the public wireless system via a dedicated fixed channel that is set in the mobile communication system, the dedicated fixed channel being fixed exclusively for a public wireless system including at least one wireless station that executes wireless communication with a wireless terminal, and a step of presenting information representing a radio wave receivable area regarding a wireless station where communication is currently available in the public wireless system according to the wireless communication status represented by the status information.

What is claimed is:

1. A management apparatus comprising:

at least one memory; and at least one processor coupled to the at least one memory and configured to:

determine whether or not distribution of status information to a mobile communication terminal via a mobile communication system that provides a mobile communication service to the mobile communication terminal is necessary, the status information representing a wireless communication status in a public wireless system including at least one wireless station that execute wireless communication with a wireless terminal;

transmit, when it is determined that the distribution is necessary, a request to the mobile communication system to set a dedicated fixed channel in a public communication network used in the mobile communication system, the dedicated fixed channel being fixed exclusively for the public wireless system; and transmit the status information to the mobile communication system to distribute the status information to the mobile communication terminal via the dedicated fixed channel, wherein the at least one processor coupled configured to:

determine that the distribution is necessary when warning information representing that wireless communication is unavailable in one wireless station included in the public wireless system is received; and transmit, as the status information, information representing a radio wave receivable area regarding a wireless station where communication is currently available in the public wireless system other than the wireless station relating to the warning information.

2. A management apparatus comprising:

at least one memory; and at least one processor coupled to the at least one memory and configured to:

determine whether or not distribution of status information to a mobile communication terminal via a mobile communication system that provides a mobile communication service to the mobile communication terminal is necessary, the status information representing a wireless communication status in a public wireless system including at least one wireless station that execute wireless communication with a wireless terminal;

transmit, when it is determined that the distribution is necessary, a request to the mobile communication system to set a dedicated fixed channel in a public communication network used in the mobile communication system, the dedicated fixed channel being fixed exclusively for the public wireless system; and transmit the status information to the mobile communication system to distribute the status information to the mobile communication terminal via the dedicated fixed channel, wherein the at least one processor coupled configured to:

determine that the distribution is necessary when warning information representing that communication with one wireless station included in the public wireless system is unavailable is received; and transmit, as the status information, information representing a radio wave receivable area regarding a wireless station where communication is currently available in the public wireless system other than the wireless station relating to the warning information.

3. A management apparatus comprising:

at least one memory; and at least one processor coupled to the at least one memory and configured to:

determine whether or not distribution of status information to a mobile communication terminal via a mobile communication system that provides a mobile communication service to the mobile communication terminal is necessary, the status information representing a wireless communication status in a public wireless system including at least one wireless station that execute wireless communication with a wireless terminal;

transmit, when it is determined that the distribution is necessary, a request to the mobile communication system to set a dedicated fixed channel in a public communication network used in the mobile communication system, the dedicated fixed channel being fixed exclusively for the public wireless system; and transmit the status information to the mobile communication system to distribute the status information to the mobile communication terminal via the dedicated fixed channel, wherein the at least one processor coupled configured to:

determine that the distribution is necessary when warning information representing an occurrence of a disaster that disables wireless communication in one wireless station included in the public wireless system is received in the public wireless system; and transmit, as the status information, information representing a radio wave receivable area regarding a wireless station where communication is currently available in the public wireless system other than the wireless station relating to the warning information.

4. The management apparatus according to claim 1, wherein the at least one processor coupled configured to transmit the warning information as the request.

5. A management apparatus comprising:
at least one memory; and
at least one processor coupled to the at least one memory and configured to:

determine whether or not distribution of status information to a mobile communication terminal via a mobile communication system that provides a mobile communication service to the mobile communication terminal is necessary, the status information representing a wireless communication status in a public wireless system including at least one wireless station that execute wireless communication with a wireless terminal;

transmit, when it is determined that the distribution is necessary, a request to the mobile communication system to set a dedicated fixed channel in a public communication network used in the mobile communication system, the dedicated fixed channel being fixed exclusively for the public wireless system; and transmit the status information to the mobile communication system to distribute the status information to the mobile communication terminal via the dedicated fixed channel, wherein the at least one processor coupled configured to, when the determination unit determines that the distribution is unnecessary after determining that the distribution is necessary, transmit a cancelation request to cancel a setting of the dedicated fixed channel.

6. The management apparatus according to claim 1, wherein the at least one processor coupled configured to, when the dedicated fixed channel is set and subsequently restoration of communication relating to a wireless station relating to the setting of the dedicated fixed channel is detected, transmit the detection result as a cancelation request to cancel the setting of the dedicated fixed channel.

7. A communication system comprising:
the management apparatus according to claim 1, the management apparatus being configured to manage communication in the public wireless system including the at least one wireless station that executes wireless communication with the wireless terminal;
the wireless terminal;
the mobile communication terminal; and a communication management apparatus configured to manage communication in the mobile communication system that provides the mobile communication service to the mobile communication terminal, wherein
the communication management apparatus includes at least one memory and at least one processor coupled to the at least one memory, the at least one processor being configured to receive the status information and a request for distribution of the status information from the management apparatus, set the dedicated fixed channel in the public communication network in response to the request, the dedicated fixed channel being fixed exclusively for the public wireless system, and transmit the status information to the mobile communication terminal via the dedicated fixed channel, and the mobile communication terminal includes at least one memory and at least one processor coupled to the at least one memory, the at least one processor being configured to receive the status information via the dedicated fixed channel, and present information representing a radio wave receivable area regarding a wireless station where communication is currently available in the public wireless system according to the wireless communication status represented by the status information.

8. A management method in a management apparatus which is configured to manage communication in a public wireless system including at least one wireless station that executes wireless communication with a wireless terminal, the management method comprising:

determining whether or not distribution of status information to a mobile communication terminal via a mobile communication system that provides a mobile communication service to the mobile communication terminal is necessary, the status information representing a wireless communication status in the public wireless system;

transmitting, when the management apparatus determines that the distribution is necessary, a request to the mobile communication system to set a dedicated fixed channel in a public communication network used in the mobile communication system, the dedicated fixed channel being fixed exclusively for the public wireless system; and transmitting the status information to the mobile communication system to distribute the status information to the mobile communication terminal via the dedicated fixed channel, wherein the determining includes determining that the distribution is necessary when warning information representing that wireless communication is unavailable in one wireless station included in the public wireless system is received, and the transmitting the status information includes transmitting, as the status information, information representing a radio wave receivable area regarding a wireless station where communication is currently available in the public wireless system other than the wireless station relating to the warning information.

9. A management method in a management apparatus which is configured to manage communication in a public wireless system including at least one wireless station that executes wireless communication with a wireless terminal, the management method comprising:

determining whether or not distribution of status information to a mobile communication terminal via a mobile communication system that provides a mobile communication service to the mobile communication terminal is necessary, the status information representing a wireless communication status in the public wireless system;

transmitting, when the management apparatus determines that the distribution is necessary, a request to the mobile communication system to set a dedicated fixed channel in a public communication network used in the mobile communication system, the dedicated fixed channel being fixed exclusively for the public wireless system; and transmitting the status information to the mobile communication system to distribute the status information to the mobile communication terminal via the dedicated fixed channel, wherein the determining includes determining that the distribution is necessary when warning information representing that communication with one wireless station included in the public wireless system is unavailable is received, and the transmitting the status information includes transmitting, as the status information, information representing a radio wave receivable area regarding a wireless station where communication is currently available in the public wireless system other than the wireless station relating to the warning information.

10. A management method in a management apparatus which is configured to manage communication in a public wireless system including at least one wireless station that executes wireless communication with a wireless terminal, the management method comprising:

determining whether or not distribution of status information to a mobile communication terminal via a mobile communication system that provides a mobile communication service to the mobile communication terminal is necessary, the status information representing a wireless communication status in the public wireless system;

transmitting, when the management apparatus determines that the distribution is necessary, a request to the mobile communication system to set a dedicated fixed channel in a public communication network used in the mobile communication system, the dedicated fixed channel being fixed exclusively for the public wireless system; and transmitting the status information to the mobile communication system to distribute the status information to the mobile communication terminal via the dedicated fixed channel, wherein the determining includes determining that the distribution is necessary when warning information representing an occurrence of a disaster that disables wireless communication in one wireless station included in the public wireless system is received in the public wireless system, and the transmitting the status information includes transmitting, as the status information, information representing a radio wave receivable area regarding a wireless station where communication is currently available in the public wireless system other than the wireless station relating to the warning information.

11. The management method according to claim 8, wherein the transmitting the request includes transmitting the warning information as the request.

12. A management method in a management apparatus which is configured to manage communication in a public wireless system including at least one wireless station that executes wireless communication with a wireless terminal, the management method comprising:

determining whether or not distribution of status information to a mobile communication terminal via a mobile communication system that provides a mobile communication service to the mobile communication terminal is necessary, the status information representing a wireless communication status in the public wireless system;

transmitting, when the management apparatus determines that the distribution is necessary, a request to the mobile communication system to set a dedicated fixed channel in a public communication network used in the mobile communication system, the dedicated fixed channel being fixed exclusively for the public wireless system; and transmitting the status information to the mobile communication system to distribute the status information to the mobile communication terminal via the dedicated fixed channel, wherein the transmitting the request includes transmitting a cancelation request to cancel a setting of the dedicated fixed channel when the determining determines that the distribution is unnecessary after determining that the distribution is necessary.

13. A non-transitory computer readable medium storing a program for causing a computer, the computer managing communication in a public wireless system including at least one wireless station that executes wireless communication with a wireless terminal, to execute:

determining whether or not distribution of status information to a mobile communication terminal via a mobile communication system that provides a mobile communication service to the mobile communication terminal is necessary, the status information representing a wireless communication status in the public wireless system;

transmitting, when it is determined that the distribution is necessary, a request to the mobile communication system to set a dedicated fixed channel in a public communication network used in the mobile communication system, the dedicated fixed channel being fixed exclusively for the public wireless system; and transmitting the status information to the mobile communication system to distribute the status information to the mobile communication terminal via the dedicated fixed channel, wherein the determining includes determining that the distribution is necessary when warning information representing that wireless communication is unavailable in one wireless station included in the public wireless system is received, and the transmitting the status information includes transmitting, as the status information, information representing a radio wave receivable area regarding a wireless station where communication is currently available in the public wireless system other than the wireless station relating to the warning information.

14. A non-transitory computer readable medium storing a program for causing a computer, the computer managing communication in a public wireless system including at least one wireless station that executes wireless communication with a wireless terminal, to execute:
  determining whether or not distribution of status information to a mobile communication terminal via a mobile communication system that provides a mobile communication service to the mobile communication terminal is necessary, the status information representing a wireless communication status in the public wireless system;
  transmitting, when it is determined that the distribution is necessary, a request to the mobile communication system to set a dedicated fixed channel in a public communication network used in the mobile communication system, the dedicated fixed channel being fixed exclusively for the public wireless system; and
  transmitting the status information to the mobile communication system to distribute the status information to the mobile communication terminal via the dedicated fixed channel, wherein
  the determining includes determining that the distribution is necessary when warning information representing that communication with one wireless station included in the public wireless system is unavailable is received, and
  the transmitting the status information includes transmitting, as the status information, information representing a radio wave receivable area regarding a wireless station where communication is currently available in the public wireless system other than the wireless station relating to the warning information.

15. A non-transitory computer readable medium storing a program for causing a computer, the computer managing communication in a public wireless system including at least one wireless station that executes wireless communication with a wireless terminal, to execute:
  determining whether or not distribution of status information to a mobile communication terminal via a mobile communication system that provides a mobile communication service to the mobile communication terminal is necessary, the status information representing a wireless communication status in the public wireless system;
  transmitting, when it is determined that the distribution is necessary, a request to the mobile communication system to set a dedicated fixed channel in a public communication network used in the mobile communication system, the dedicated fixed channel being fixed exclusively for the public wireless system; and
  transmitting the status information to the mobile communication system to distribute the status information to the mobile communication terminal via the dedicated fixed channel, wherein
  the determining includes determining that the distribution is necessary when warning information representing an occurrence of a disaster that disables wireless communication in one wireless station included in the public wireless system is received in the public wireless system, and
  the transmitting the status information includes transmitting, as the status information, information representing a radio wave receivable area regarding a wireless station where communication is currently available in the public wireless system other than the wireless station relating to the warning information.

16. The non-transitory computer readable medium according to claim 13, wherein the transmitting the request includes transmitting the warning information as the request.

17. A non-transitory computer readable medium storing a program for causing a computer, the computer managing communication in a public wireless system including at least one wireless station that executes wireless communication with a wireless terminal, to execute:
  determining whether or not distribution of status information to a mobile communication terminal via a mobile communication system that provides a mobile communication service to the mobile communication terminal is necessary, the status information representing a wireless communication status in the public wireless system;
  transmitting, when it is determined that the distribution is necessary, a request to the mobile communication system to set a dedicated fixed channel in a public communication network used in the mobile communication system, the dedicated fixed channel being fixed exclusively for the public wireless system; and
  transmitting the status information to the mobile communication system to distribute the status information to the mobile communication terminal via the dedicated fixed channel, wherein
  the transmitting the request includes transmitting a cancelation request to cancel a setting of the dedicated fixed channel when the determining determines that the distribution is unnecessary after determining that the distribution is necessary.

18. A communication system comprising:
  the management apparatus according to claim 2, the management apparatus being configured to manage communication in the public wireless system including the at least one wireless station that executes wireless communication with the wireless terminal;
  the wireless terminal;
  the mobile communication terminal; and
  a communication management apparatus configured to manage communication in the mobile communication system that provides the mobile communication service to the mobile communication terminal, wherein
  the communication management apparatus includes at least one memory and at least one processor coupled to the at least one memory, the at least one processor being configured to
  receive the status information and a request for distribution of the status information from the management apparatus,
  set the dedicated fixed channel in the public communication network in response to the request, the dedicated fixed channel being fixed exclusively for the public wireless system, and
  transmit the status information to the mobile communication terminal via the dedicated fixed channel, and
  the mobile communication terminal includes at least one memory and at least one processor coupled to the at least one memory, the at least one processor being configured to
  receive the status information via the dedicated fixed channel, and
  present information representing a radio wave receivable area regarding a wireless station where communication is currently available in the public wireless system according to the wireless communication status represented by the status information.

19. A communication system comprising:
the management apparatus according to claim 3, the management apparatus being configured to manage communication in the public wireless system including the at least one wireless station that executes wireless communication with the wireless terminal;
the wireless terminal;
the mobile communication terminal; and
a communication management apparatus configured to manage communication in the mobile communication system that provides the mobile communication service to the mobile communication terminal, wherein
the communication management apparatus includes at least one memory and at least one processor coupled to the at least one memory, the at least one processor being configured to
receive the status information and a request for distribution of the status information from the management apparatus,
set the dedicated fixed channel in the public communication network in response to the request, the dedicated fixed channel being fixed exclusively for the public wireless system, and
transmit the status information to the mobile communication terminal via the dedicated fixed channel, and
the mobile communication terminal includes at least one memory and at least one processor coupled to the at least one memory, the at least one processor being configured to
receive the status information via the dedicated fixed channel, and
present information representing a radio wave receivable area regarding a wireless station where communication is currently available in the public wireless system according to the wireless communication status represented by the status information.

20. A communication system comprising:
the management apparatus according to claim 5, the management apparatus being configured to manage communication in the public wireless system including the at least one wireless station that executes wireless communication with the wireless terminal;
the wireless terminal;
the mobile communication terminal; and
a communication management apparatus configured to manage communication in the mobile communication system that provides the mobile communication service to the mobile communication terminal, wherein
the communication management apparatus includes at least one memory and at least one processor coupled to the at least one memory, the at least one processor being configured to
receive the status information and a request for distribution of the status information from the management apparatus,
set the dedicated fixed channel in the public communication network in response to the request, the dedicated fixed channel being fixed exclusively for the public wireless system, and
transmit the status information to the mobile communication terminal via the dedicated fixed channel, and
the mobile communication terminal includes at least one memory and at least one processor coupled to the at least one memory, the at least one processor being configured to
receive the status information via the dedicated fixed channel, and
present information representing a radio wave receivable area regarding a wireless station where communication is currently available in the public wireless system according to the wireless communication status represented by the status information.

* * * * *